(12) United States Patent
Kawano et al.

(10) Patent No.: US 7,221,646 B2
(45) Date of Patent: May 22, 2007

(54) OPTIMIZED PATH ESTABLISHMENT METHOD AND NETWORK MANAGEMENT SYSTEM USING THE METHOD

(75) Inventors: Satoshi Kawano, Sendai (JP); Hidekazu Nakajima, Sendai (JP); Yoichi Azuma, Sendai (JP); Mitsumaro Kimura, Sendai (JP); Nobuo Takahashi, Sendai (JP)

(73) Assignee: Fujitsu Limited, Kawasaki (JP)

( * ) Notice: Subject to any disclaimer, the term of this patent is extended or adjusted under 35 U.S.C. 154(b) by 881 days.

(21) Appl. No.: 09/962,180

(22) Filed: Sep. 24, 2001

(65) Prior Publication Data

US 2002/0186682 A1    Dec. 12, 2002

(30) Foreign Application Priority Data

Jun. 7, 2002   (JP) ............................. 2001-172142

(51) Int. Cl.
  *H04J 1/16*   (2006.01)
  *H04L 12/28*  (2006.01)
  *H04L 12/56*  (2006.01)

(52) U.S. Cl. ............ 370/218; 370/228; 370/238; 370/248; 370/252; 370/254; 370/400

(58) Field of Classification Search ........ 370/218, 370/238, 238.1, 254–256, 351–357, 382, 370/389, 392, 400, 395.31, 408; 709/238–242
See application file for complete search history.

(56) References Cited

U.S. PATENT DOCUMENTS 6,023,733 A * 2/2000 Periasamy et al. ......... 709/241
6,400,681 B1 * 6/2002 Bertin et al. ............... 370/218
6,483,808 B1 * 11/2002 Rochberger et al. ....... 370/238
6,484,092 B2 * 11/2002 Seibel ........................ 701/209
6,594,268 B1 * 7/2003 Aukia et al. ................ 370/400
6,801,534 B1 * 10/2004 Arrowood et al. ......... 370/400
6,981,055 B1 * 12/2005 Ahuja et al. ............... 709/238

FOREIGN PATENT DOCUMENTS

| JP | 02196539 | 8/1990 |
|---|---|---|
| JP | 02202740 | 8/1990 |
| JP | 05244154 | 9/1993 |
| JP | 09135243 | 5/1997 |
| JP | 2000232472 | 8/2000 |
| WO | WO97/23101 | 6/1997 |

* cited by examiner

*Primary Examiner*—Chi Pham
*Assistant Examiner*—Melanie Jagannathan
(74) *Attorney, Agent, or Firm*—Katten Muchin Rosenman LLP

(57) ABSTRACT

A method used for establishing an optimized path between two endpoints in a transmission network including subnetworks is provided. In the method, two endpoints and route selection elements are specified, a first route search is performed to search for route candidates each of which connects subnetworks by using data on network resources according to the route selection elements, and the route candidates is stored in a dynamic routing table. Then, at least a route candidate is selected as a selected route candidate according to the route selection elements, and a second route search is performed to search for a route connecting network elements in each subnetwork on the selected route candidate.

19 Claims, 24 Drawing Sheets

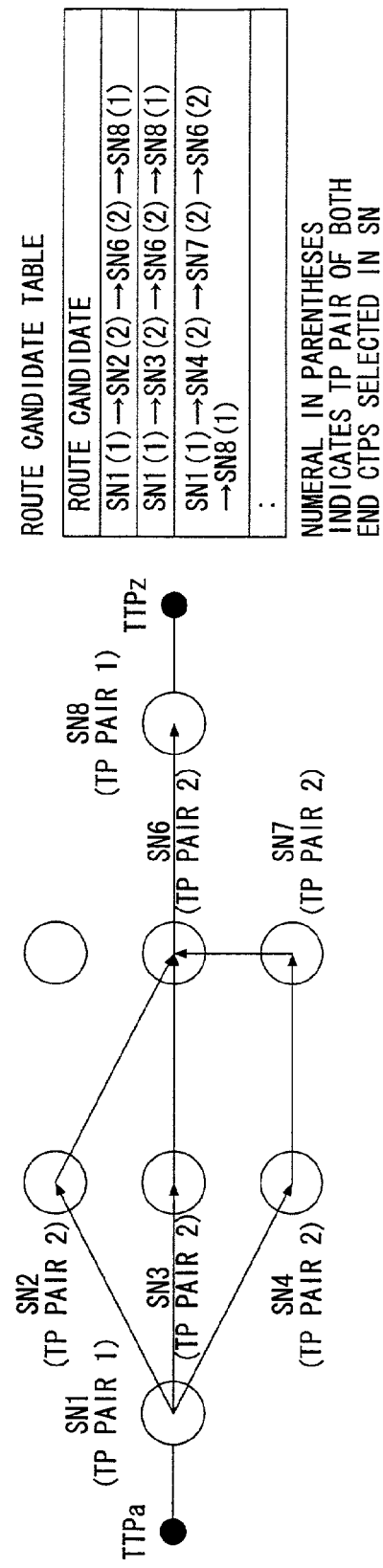

FIG.8D

| ROUTE CANDIDATE | DISTANCE |
|---|---|
| SN1 (1) →SN2 (2) →SN5 (2) →SN8 (1) | 20 |
| SN1 (1) →SN3 (2) →SN6 (2) →SN8 (1) | 25 |
| SN1 (1) →SN4 (2) →SN7 (2) →SN8 (1) | 28 |
| : | : |

FIG.8E

| ROUTE CANDIDATE | NETWORK ELEMENTS |
|---|---|
| SN1 (1) →SN2 (2) →SN6 (2) →SN8 (1) | 9 × |
| SN1 (1) →SN3 (2) →SN6 (2) →SN8 (1) | 7 × |
| SN1 (1) →SN4 (2) →SN7 (2) →SN6 (2) →SN8 (1) | 14 × |
| : | : |

FIG.8F

| ROUTE CANDIDATE | ALARMS |
|---|---|
| SN1 (1) →SN3 (2) →SN5 (2) →SN8 (1) | 50 |
| SN1 (1) →SN3 (2) →SN7 (2) →SN8 (1) | 70 |
| SN1 (1) →SN4 (2) →SN7 (2) →SN8 (1) | 55 |
| : | : |

FIG.9

ROUTE CANDIDATE TABLE
(SHORTEST DISTANCE)

| ROUTE CANDIDATE |
|---|
| SN1(1) →SN2(2) →SN5(2) →SN8(1) |
| SN1(1) →SN3(2) →SN6(2) →SN8(1) |
| SN1(1) →SN4(2) →SN7(2) →SN8(1) |
| : |

ROUTE CANDIDATE TABLE
(MINIMUM NUMBER OF NETWORK ELEMENTS)

| ROUTE CANDIDATE |
|---|
| SN1(1) →SN2(2) →SN6(2) →SN8(1) |
| SN1(1) →SN3(2) →SN6(2) →SN8(1) |
| SN1(1) →SN4(2) →SN7(2) →SN6(2) →SN8(1) |
| : |

ROUTE CANDIDATE TABLE
(MINIMUM NUMBER OF ALARMS)

| ROUTE CANDIDATE |
|---|
| SN1(1) →SN3(2) →SN5(2) →SN8(1) |
| SN1(1) →SN3(2) →SN7(2) →SN8(1) |
| SN1(1) →SN4(2) →SN7(2) →SN8(1) |
| : |

①MERGE ALL TABLES →

| ROUTE CANDIDATE |
|---|
| SN1(1) →SN2(2) →SN5(2) →SN8(1) |
| SN1(1) →SN3(2) →SN6(2) →SN8(1) |
| SN1(1) →SN4(2) →SN7(2) →SN8(1) |
| SN1(1) →SN2(2) →SN6(2) →SN8(1) |
| SN1(1) →SN4(2) →SN7(2) →SN6(2) →SN8(1) |
| SN1(1) →SN3(2) →SN5(2) →SN8(1) |
| SN1(1) →SN3(2) →SN7(2) →SN8(1) |

②DISPLAY DISTANCE, NUMBER OF NETWORK ELEMENTS, NUMBER OF ALARMS FOR EACH ROUTE

③EVALUATION BY USING OPTIMIZATION COEFFICIENTS FOR EACH SELECTION ELEMENT

| ROUTE CANDIDATE | DISTANCE L (km) | NUMBER OF NETWORK ELEMENTS N | NUMBER OF ALARMS A | SUM |
|---|---|---|---|---|
| SN1(1) →SN2(2) →SN5(2) →SN8(1) | 20 | 12 | 60 | 17.6 |
| SN1(1) →SN3(2) →SN6(2) →SN8(1) | 25 | 7 | 70 | 15.1 |
| SN1(1) →SN4(2) →SN7(2) →SN8(1) | 28 | 15 | 50 | 19.8 |
| SN1(1) →SN2(2) →SN6(2) →SN8(1) | 35 | 9 | 60 | 16.7 |
| SN1(1) →SN4(2) →SN7(2) →SN6(2) →SN8(1) | 40 | 8 | 75 | 17.9 |
| SN1(1) →SN3(2) →SN5(2) →SN8(1) | 35 | 14 | 50 | 19.7 |
| SN1(1) →SN3(2) →SN7(2) →SN8(1) | 40 | 14 | 55 | 20.7 |

④SORTING IN ASCENDING ORDER OF SUM

[SETTING OF OPTIMIZATION COEFFICIENTS]

| DISTANCE k3 | NUMBER OF NETWORK ELEMENTS k1 | NUMBER OF ALARMS k2 |
|---|---|---|
| 10% | 80% | 10% |

SUM=k1・N+k2・A+k3・L

BASIC FORM OF DYNAMIC ROUTING TABLE

| No | ROUTE CANDIDATE | DISTANCE km | NETWORK ELEMENT NUMBER | ALARM NUMBER | SUM |
|---|---|---|---|---|---|
| 1 | SN1(1) →SN3(2) →SN6(2) →SN8(1) | 25 | 7 | 70 | 15.1 |
| 2 | SN1(1) →SN2(2) →SN6(2) →SN8(1) | 35 | 9 | 60 | 16.7 |
| 3 | SN1(1) →SN2(2) →SN5(2) →SN8(1) | 20 | 12 | 60 | 17.6 |
| 4 | SN1(1) →SN4(2) →SN7(2) →SN6(2) →SN8(1) | 40 | 8 | 75 | 17.9 |
| 5 | SN1(1) →SN3(2) →SN5(2) →SN8(1) | 35 | 14 | 50 | 19.7 |
| 6 | SN1(1) →SN4(2) →SN7(2) →SN8(1) | 28 | 15 | 50 | 19.8 |
| 7 | SN1(1) →SN3(2) →SN7(2) →SN8(1) | 40 | 14 | 55 | 20.7 |

FIG.11

| No | ROUTE CANDIDATE | FAILED CONNECTION LIST |
|---|---|---|
| 1 | SN1 (1) →SN4 (2) →SN7 (2) →SN8 (1) | |
| 2 | SN1 (1) →SN2 (2) →SN5 (2) →SN8 (1) | |
| 3 | SN1 (1) →SN3 (2) →SN5 (2) →SN8 (1) | |
| 4 | SN1 (1) →SN3 (2) →SN6 (2) →SN8 (1) | |
| 5 | SN1 (1) →SN2 (2) →SN6 (2) →SN8 (1) | |
| 6 | SN1 (1) →SN3 (2) →SN7 (2) →SN8 (1) | |
| 7 | SN1 (1) →SN4 (2) →SN7 (2) →SN6 (2) →SN8 (2) | |

FIG.13

| No | ROUTE CANDIDATE | FAILED CONNECTION LIST |
|---|---|---|
| 1 | SN1 (1) →SN4 (2) →SN7 (2) →SN8 (1) | |
| 2 | SN1 (1) →SN2 (2) →SN5 (2) →SN8 (1) | |
| 3 | SN1 (1) →SN3 (2) →SN5 (2) →SN8 (1) | |
| 4 | SN1 (1) →SN3 (2) →SN6 (2) →SN8 (1) | |
| 5 | SN1 (1) →SN2 (2) →SN6 (2) →SN8 (1) | |
| 6 | SN1 (1) →SN3 (2) →SN7 (2) →SN8 (1) | |
| 7 | SN1 (1) →SN4 (2) →SN7 (2) →SN6 (2) →SN8 (2) | |

FIG.15

| No | ROUTE CANDIDATE | FAILED CONNECTION LIST |
|---|---|---|
| 1 | SN1 (1) →SN4 (2) →SN7 (2) →SN8 (1) | SN7 (2) |
| 2 | SN1 (1) →SN2 (2) →SN5 (2) →SN8 (1) | |
| 3 | SN1 (1) →SN3 (2) →SN5 (2) →SN8 (1) | |
| 4 | SN1 (1) →SN3 (2) →SN6 (2) →SN8 (1) | |
| 5 | SN1 (1) →SN2 (2) →SN6 (2) →SN8 (1) | |
| 6 | SN1 (1) →SN3 (2) →SN7 (2) →SN8 (1) | SN7 (2) |
| 7 | SN1 (1) →SN4 (2) →SN7 (2) →SN6 (2) →SN8 (2) | SN7 (2) |

OPTIMIZED PATH ESTABLISHMENT METHOD AND NETWORK MANAGEMENT SYSTEM USING THE METHOD

BACKGROUND OF THE INVENTION

1. Field of the Invention

The present invention relates to an optimized path establishment method and a network management system using the optimized path establishment method. More particularly, the present invention relates to a method for establishing an optimized path by selecting an optimum route which connects subnetworks and to a network management system using the optimized path establishment method, wherein the subnetwork is a smallest management unit in network element groups which form a transmission network.

2. Description of the Related Art

Conventionally, routing technologies for avoiding various failures on paths under operation are disclosed in a transmission network management field. According to the routing technologies, a network manager determines an optimum route on the basis of minimum distance, traffic, available capacity, number of failures and the like manually, and the network manager generates a routing table from the optimum route beforehand. In addition, every time when a network configuration is changed, the network manager updates the routing table to a newest one.

There are following problems when the network management system has the routing table which is fixedly generated by the network manager beforehand.

First, since the number of network elements which form the subnetwork is very large in a large transmission network, it takes much time to check manually every route which connects endpoints when designing such a large transmission network. Second, in order to implement a network configuration according to network design, it is necessary to incorporate the routing table which is designed beforehand into the network management system.

Third, when a subnetwork is added or removed in the large transmission network, it is necessary to redesign a plurality of routes in consideration of all surrounding subnetworks which are physically connected to the added or removed subnetwork. Therefore, the routing table, which includes fixed data, needs maintenance frequently.

Fourth, as preparedness of a failure in a transmission network which is under operation, it is necessary to reserve alternative routes. Therefore, there are redundant network resources.

Fifth, since network design is performed by the network manager manually, there is a high possibility that the optimum route is overlooked due to a mistake or lack of consideration in designing.

Sixth, when establishing a path, it is necessary to specify subnetworks and CTPs in each subnetwork one by one, in which the CTP is a connection point between a subnetwork and an adjacent subnetwork located in the edge of the subnetwork.

Seventh, since the path establishment operation abends when path establishment fails in midstream, an operation to continue the path establishment becomes necessary.

Eighth, the network manager may be forced to correct the routing table when path establishment fails. Thus, it takes much time to complete the path establishment operation.

SUMMARY OF THE INVENTION

It is an object of the present invention to provide an optimized path establishment method and a network management system using the optimized path establishment method in which route checking and network design are performed in a short time even for a large transmission network, time for maintenance associated with network configuration change can be reduced, and it is unnecessary to reserve the alternative routes so that costs for equipment can be reduced.

The above object can be achieved by a method used for establishing an optimized path between two endpoints in a transmission network including subnetworks, the method includes the steps of:

specifying two endpoints and route selection elements;

performing a first route search to search for route candidates each of which connects subnetworks by using data on network resources according to the route selection elements, and storing the route candidates in a dynamic routing table;

selecting a route candidate as a selected route candidate according to the route selection elements; and performing a second route search to search for a route connecting network elements in each subnetwork on the selected route candidate so that the optimized path is established.

According to the present invention, route check and network design can be performed in a short time. In addition, time required for maintenance associated with network configuration change can be reduced, and it is not necessary to reserve alternative routes beforehand. Thus, equipment cost can be reduced.

BRIEF DESCRIPTION OF THE DRAWINGS

Other objects, features and advantages of the present invention will become more apparent from the following detailed description when read in conjunction with the accompanying drawings, in which:

FIG. 9 shows a concrete example of a process for generating the dynamic routing table 30;

FIG. 11 shows an example of the dynamic routing table 30;

FIG. 13 shows an example of the dynamic routing table 30;

FIG. 15 shows an example of the dynamic routing table 30;

DETAILED DESCRIPTION OF THE PREFERRED EMBODIMENTS

Figure 1:
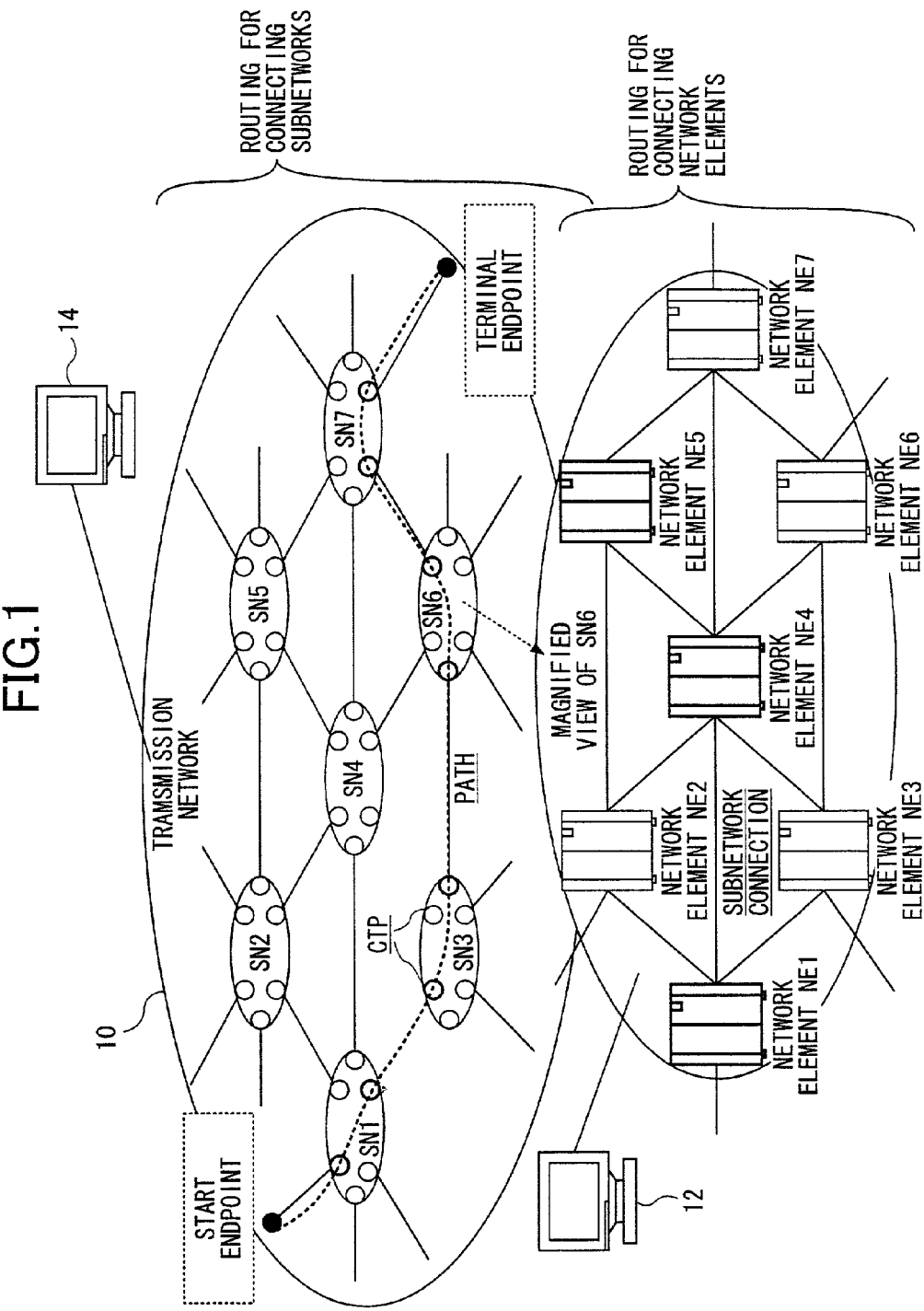
FIG. 1 is a block diagram of a transmission network to which a network management system of the present invention is applied according to an embodiment of the present invention.

FIG. 1 shows a block diagram of a transmission network 10 to which the network management system of the present invention is applied according to an embodiment of the present invention. In the figure, a transmission network 10 includes a plurality of subnetworks SN1–SN7. The subnetwork is a minimum management unit in network element groups which form the transmission network 10. For example, the subnetwork SN6 includes network elements NE1–NE7 such as transmission apparatuses.

A subordinate network management system 12 is connected to each subnetwork in which the subordinate network management system 12 manages network elements which forms the subnetwork. In addition, a network management system 14 which manages the whole of the transmission network 10 is connected to the transmission network 10.

Figure 2:
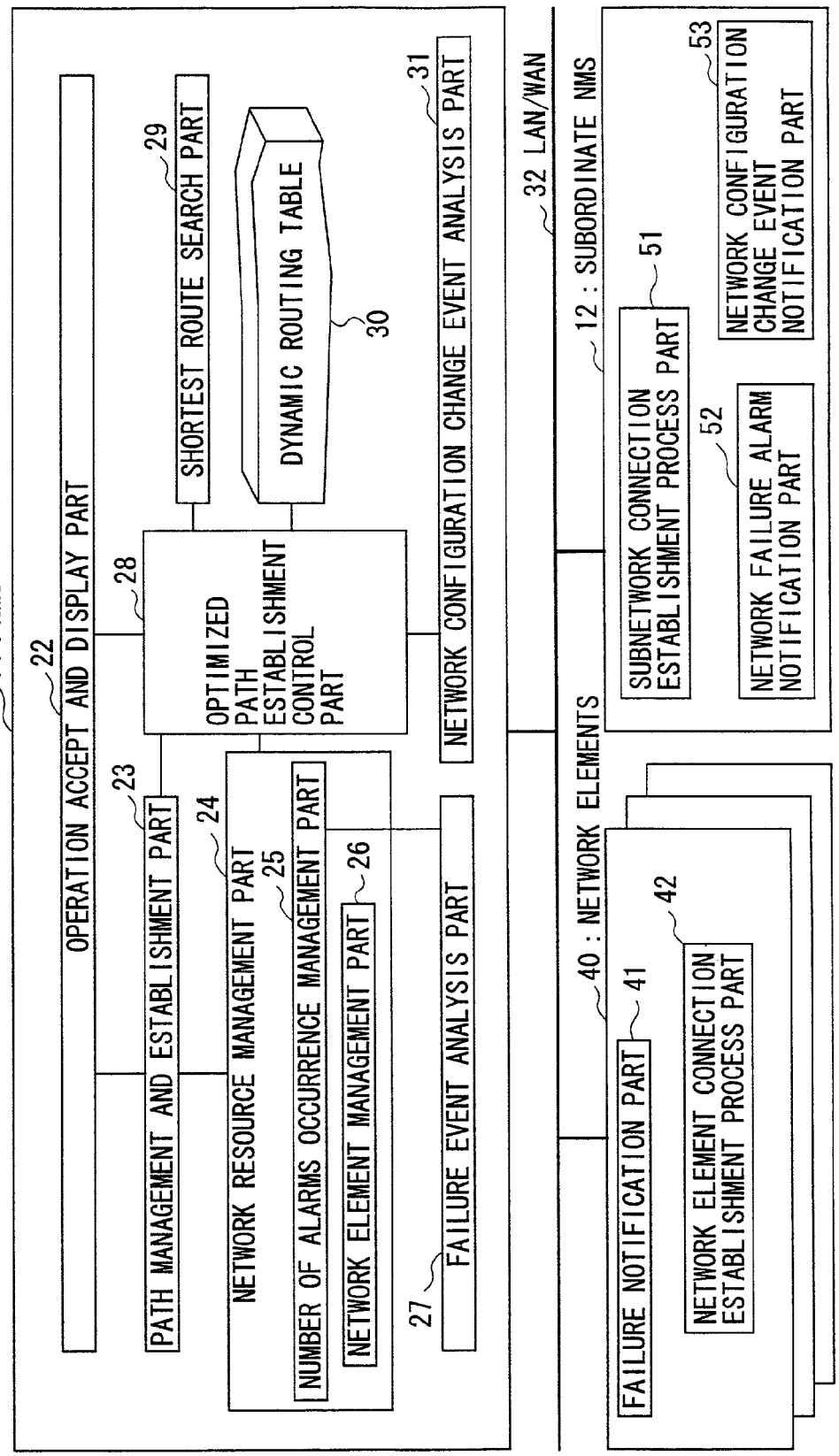
FIG. 2 is a block diagram of the network management system of the present invention.

FIG. 2 shows a block diagram of the network management system of the present invention. In the figure, the network management system (NMS) 14 includes an operation accept and display part 22, a path management and establishment part 23, a network resource management part 24, a number of alarm occurrence management part 25 and a network element management part 26 in the network resource management part 24, a failure event analysis part 27, an optimized path establishment control part 28, a shortest route search part 29, a dynamic routing table 30, and a network configuration change event analysis part 31. The network management system is connected to a plurality of network elements 40 and the subordinate network management systems (subordinate NMS) 12 via a LAN/WAN 32.

Each network element 40 includes a failure notification part 41 and a network element connection establishment process part 42. The subordinate network management system 12 includes a subnetwork connection establishment process part 51 and a network configuration change event notification part 53.

Embodiment 1

In the following, a process will be described. In this process, route selection is performed in which routes for connecting subnetworks are selected so that the dynamic routing table 30 is generated. The process is executed when the network manager specifies path establishment operation.

(Step 1) The path management and establishment part 23 asks the network resource management part 24 about a state of implementation and availability of two endpoints (this endpoint is called TTP) which are designated in the path establishment operation by the network manager. Then, the path management and establishment part 23 provides the two endpoints (a start endpoint and a terminal endpoint) and route selection criteria to the optimized path establishment control part 28. The route selection criteria includes route selection elements which relate to route optimization and optimization coefficients each of which represents degree of optimization for a route selection element.

(Step 2) The optimized path establishment part 28 keeps a dynamic memory for generating the dynamic routing table 30. Then, the optimized path establishment part 28 inputs the start endpoint (start TTP) and the terminal endpoint (terminal TTP) to the shortest route search part 29 and inputs following route selection elements (a)–(d) included in the route selection criteria one by one. When the route selection criteria is not designated, defined values in the network management system can be used.

Figure 3:
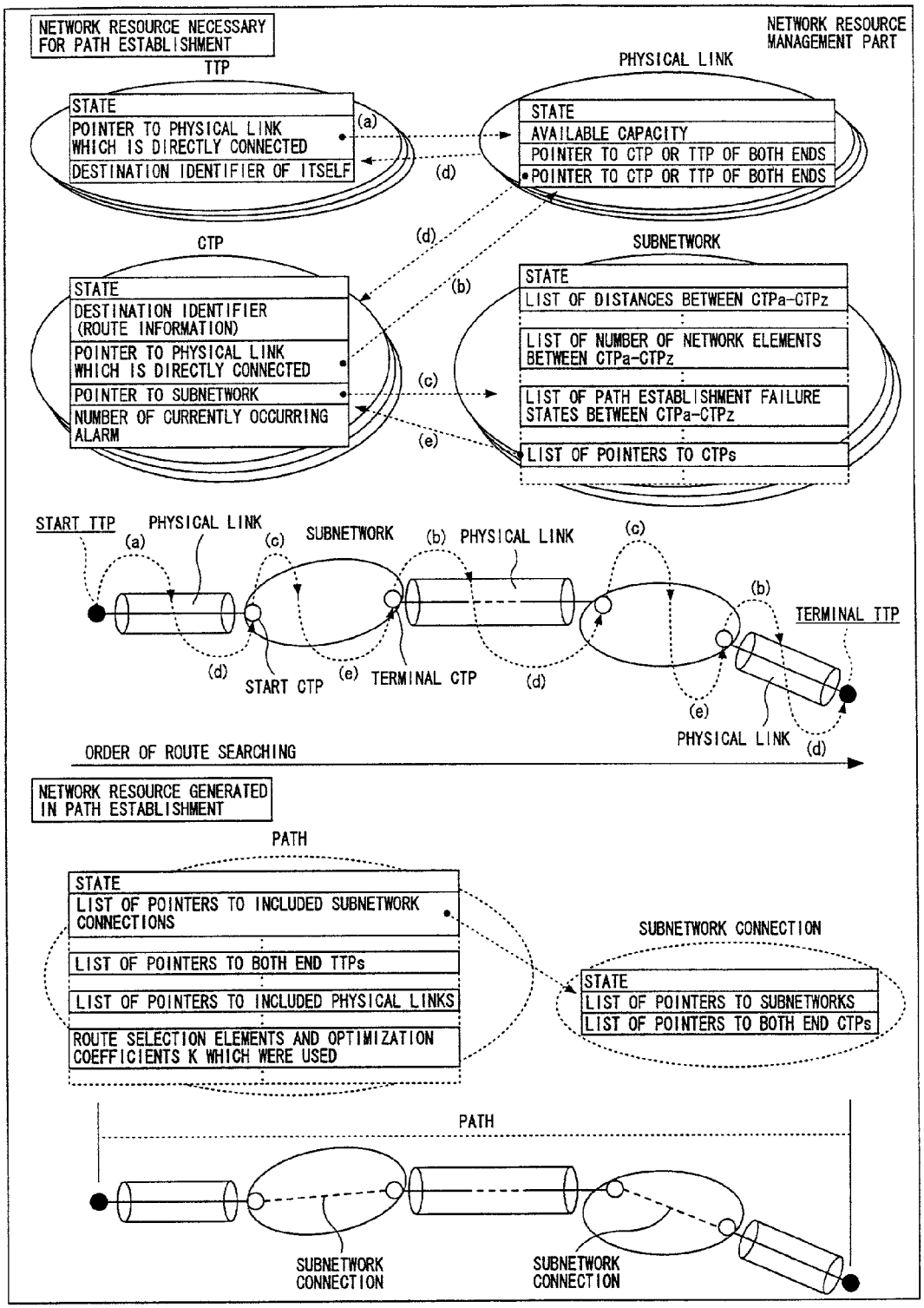
FIG. 3 shows data on each network resource and related data between network resources which are included in the network resource management part 24.

(a) a minimum number of network elements included between CTPs in subnetworks on the route, which means a route in which the number of the network elements is minimum is selected, (b) a minimum number of alarm occurrence in the route, which means a route in which the number of alarms is minimum is selected, wherein the alarm is a quality alarm in a transmission line detected by a performance monitor, (c) route shortest distance, which means a route in which length of the route is shortest is selected, (d) route available capacity, which means a route having maximum available capacity is selected, (Step 3) While the shortest route search part 29 refers to related data between network resources shown in FIG. 3 which are managed by the network resource management part 24, and, searches for an optimum route by using a shortest route method using the route selection elements, the shortest route search part 29 extracts a list of top n routes ($n \geq 1$, and n can be specified beforehand) represented by selected subnetworks and connection between CTPs in each subnetwork. Then, the shortest route search part 29 outputs the extracted data to the dynamic memory area kept by the optimized path establishment control part 28.

FIG. 3 shows data on each network resource and related data between network resources which are included in the network resource management part 24. The network resources required for path establishment includes, for each TTP, the state, a pointer to a physical link which is directly connected and a destination identifier of itself. For the physical link, the network resources include the state, an available capacity, two pointers to CTP or TTP of both ends. For each CTP, the network resources include the state, a destination identifier (route information), a pointer to a physical link which is directly connected, a pointer to a subnetwork, and a number of currently occurring alarm. For each subnetwork, the network resources include the state, a list of distances between CTPs, a list of network element number between CTPs, a list of path establishment failure states between CTPs, a list of connections between CTPs and a list of pointers to CTPs.

Network resources generated by path establishment include, for each path, the state, a list of pointers to included subnetwork connections, a list of pointers to both end TTPs, a list of pointers to included physical links, route selection elements and optimization coefficients k which were used. For each subnetwork connection, network resources generated by path establishment include the state, a list of pointers to subnetworks and a list of pointers to both end CTPs. Each network resource such as TTP, CTP, physical link, subnetwork, path, subnetwork connection shown in FIG. 3 is called "network resource object".

FIG. 4–FIG. 7 shows data inquiry sequences in the network resource management part 24 by using the above-mentioned route selection elements (a)–(d) respectively.

Figure 4:
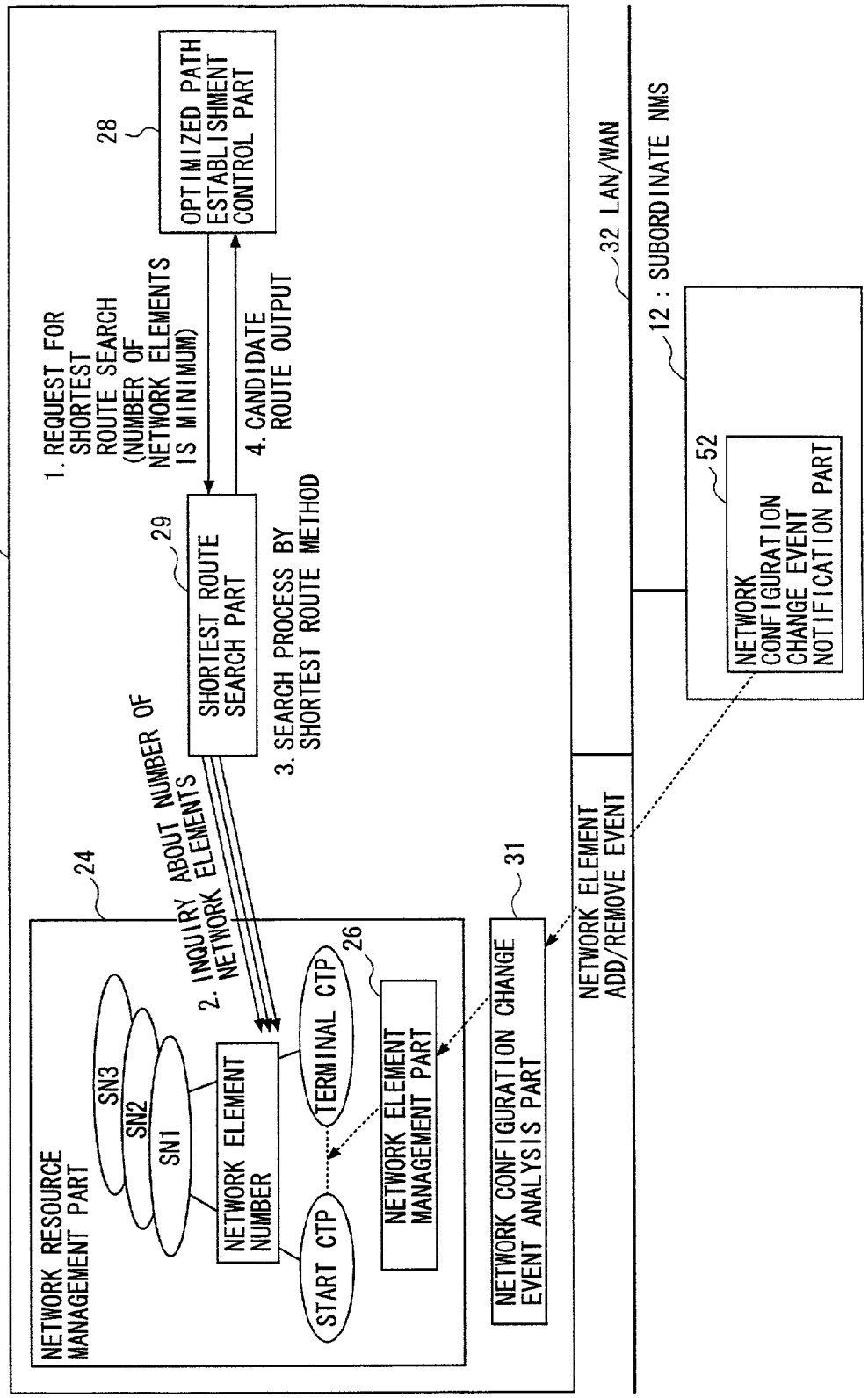
FIG. 4 is a sequence diagram when a criterion that the number of network elements included between CTPs of the subnetworks on the route is minimum is designated as the route selection element.

FIG. 4 shows a sequence diagram when the element that the number of network elements between CTPs in subnetworks is minimum is designated as the route selection element. As shown in the figure, the shortest route search part 29 receives a shortest route search request (route selection element=minimum number of network elements). Then, the shortest route search part 29 inquires about the number of network elements between each pair of start CTP and terminal CTP for each subnetwork to the network resource management part 24 in order to perform the shortest route method. Then, the shortest route search part 29 extracts a route candidate in which the number of the network elements is minimum. At this time, the top N route candidates can be extracted with respect to the number.

The network element management part 26 manages the number of the network elements in the whole NMS. At the time when the network configuration change event analysis part 31 receives a network configuration change event from the network configuration change event notification part 53 in the subordinate NMS 12, the network element management part 26 distributes the network configuration change event to the subnetworks shown in FIG. 3. In the subnetworks shown in FIG. 3, information about which route connecting CTPs includes added or removed network elements is extracted from the received event information. After that, the information is held between corresponding CTPs. Accordingly, a route candidate table shown in FIG. 8B is output from the shortest route search part 29.

Figure 5:
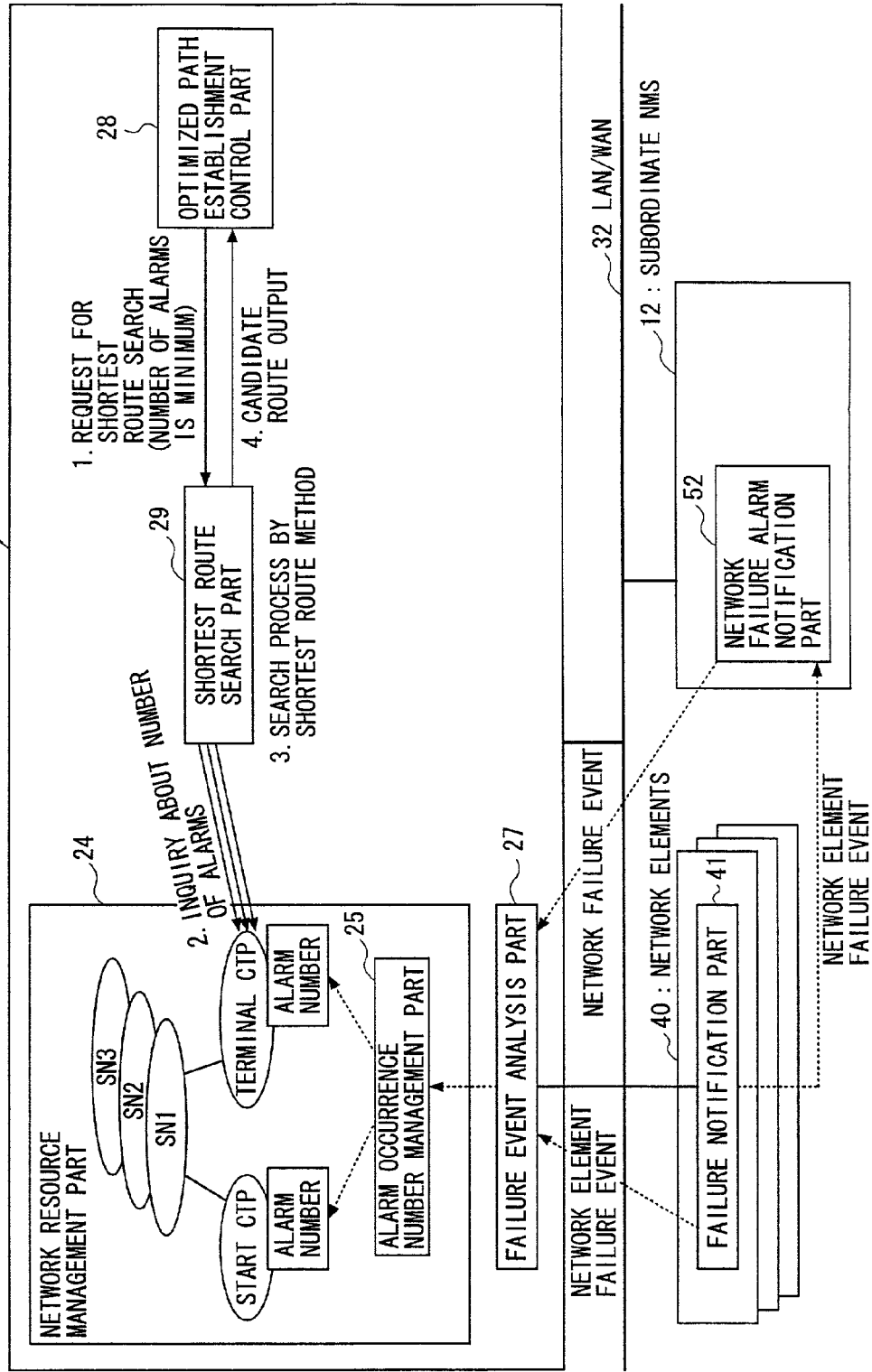
FIG. 5 is a sequence diagram when a criterion that the number of alarm occurrences is minimum in the route is designated as the route selection element.

FIG. 5 shows the sequence diagram when the element that the number of alarm occurrences is minimum is designated as the route selection element. In the figure, the shortest route search part 29 receives a shortest route search request (route selection element=alarm minimum number). Then, the shortest route search part 29 inquires about the number of alarms occurring in every CTP for each subnetwork in the network resource management part 24 in order to perform the shortest route method. After that, the shortest route search part 29 extracts a route candidate having the minimum number of alarm occurrence. At this time, it is possible that the top N route candidates can be extracted with respect to the number of alarms.

Figure 8A:
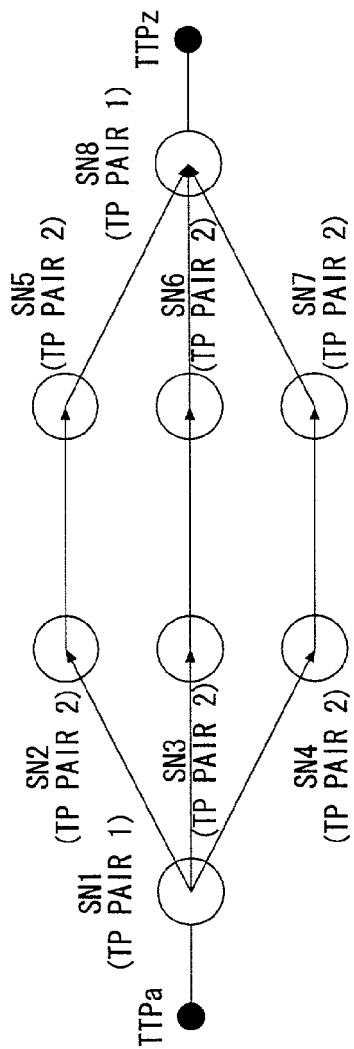
FIG. 8 shows examples of route candidate table output from the shortest route search part 29.
Figure 8C:
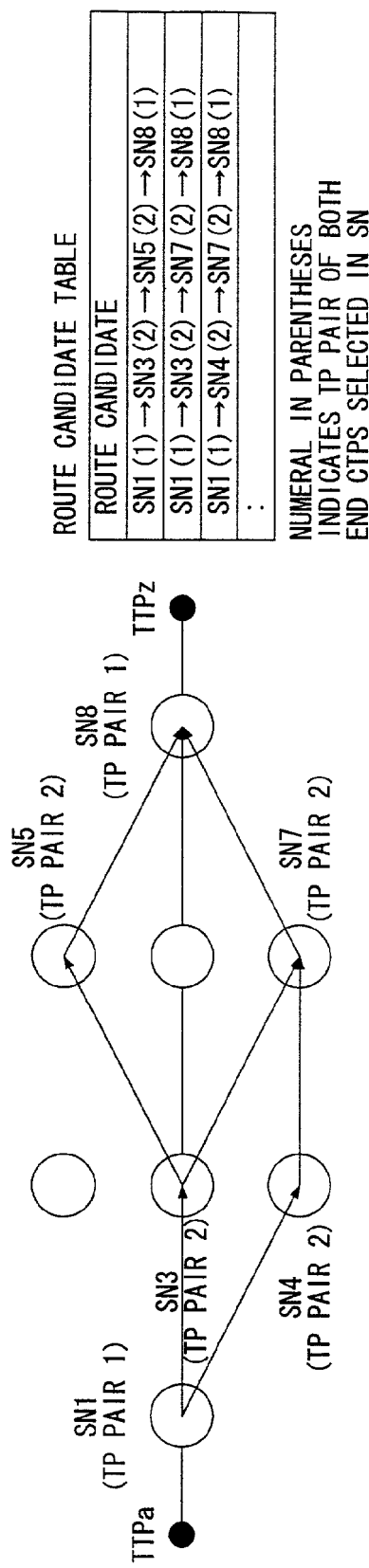

The number of alarm occurrences management part 25 manages alarms in the whole NMS. When the failure event analysis part 27 receives a failure event from the failure notification part 41 in the network element 40 or the failure event alarm notification part 52 in the subordinate NMS 12, the number of alarm occurrences management part 25 distributes the failure event to each CTP shown in FIG. 3. Accordingly, a route candidate table shown in FIG. 8C is output from the shortest route search part 29.

Figure 6:
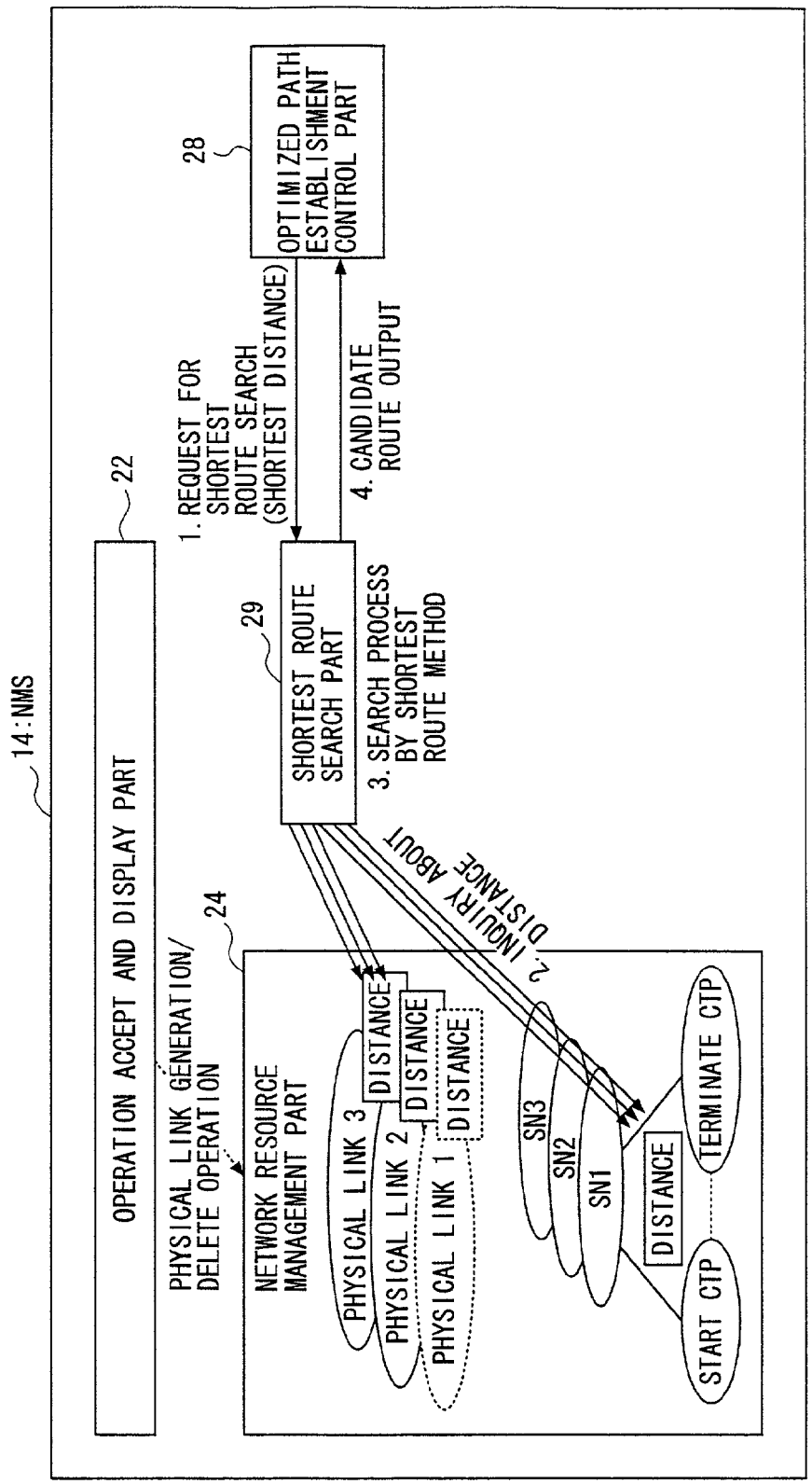
FIG. 6 shows a sequence diagram when a criterion that distance of the route is shortest is designated as the route selection element.

FIG. 6 shows the sequence diagram when the element that distance is shortest is designated as the route selection element. In the figure, the shortest route search part 29 receives a shortest route search request (route selection element=shortest distance). Then, the shortest route search part 29 inquires about distance between CTPs for every route connecting CTPs in each subnetwork in the network resource management part 24 in order to perform the shortest route method. In addition, the shortest route search part 29 inquires about length of the physical link adjacent to the CTP for every physical link in the network resource management part 24. After that, the shortest route search part 29 extracts a route candidate in which the distance is shortest. At this time, it is possible that the top N route candidates can be extracted with respect to the distance.

At the time when the network resource management part 24 receives a physical link establishment/release operation from the operation accept and display part 22, the network resource management part 24 performs generation/deletion of the physical link shown in FIG. 3. When the physical link is generated, distance must be designated and the distance is held as attribute data of the physical link shown in FIG. 3. Accordingly, a route candidate table shown in FIG. 8A is output from the shortest route search part 29.

Figure 7:
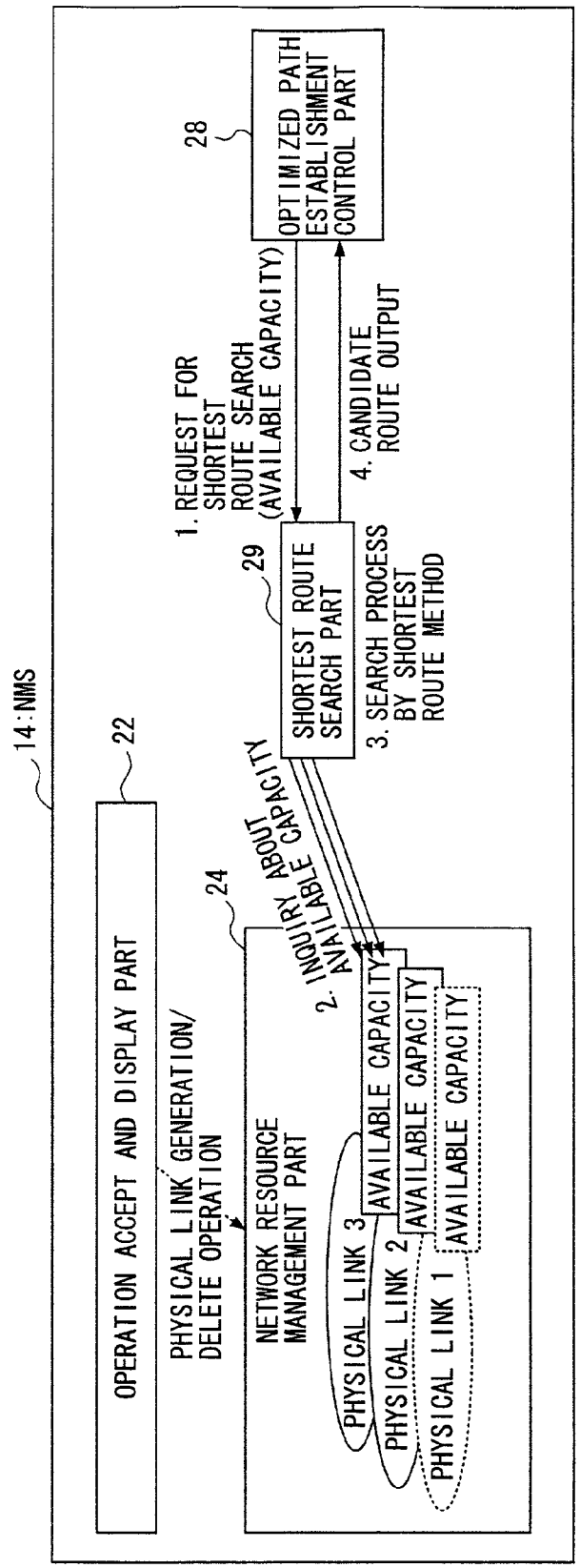
FIG. 7 shows a sequence diagram when the route available capacity is designated as the route selection element.

FIG. 7 shows the sequence diagram when the element that available capacity is maximum is designated as the route selection element. In the figure, the shortest route search part 29 receives a shortest route search request (route selection element=maximum available capacity). Then, the shortest route search part 29 inquires about available capacity of the physical link for every physical link in the network resource management part 24 in order to perform the shortest route method. After that, the shortest route search part 29 extracts a route candidate having the maximum available capacity. At this time, it is possible that the top N route candidates can be extracted with respect to the available capacity.

At the time when the network resource management part 24 receives a physical link establishment/release operation from the operation accept and display part 22, the network resource management part 24 performs generation/deletion of the physical link shown in FIG. 3. When the physical link is generated, available capacity must be designated and the available capacity is held as attribute data of the physical link shown in FIG. 3. In addition, since the available capacity changes in a physical link due to add or delete of paths, data is updated every time when such add or delete of paths arises.

(Step 4) When the route selection elements and optimization coefficients k1, k2, k3, k4, . . . each corresponding to an route selection element are designated by the network manager in the path establishment operation, wherein the selection elements includes the number of network elements N included between CTPs of the subnetworks in the route, the number of alarm occurrences A, minimum distance L, available capacity C and the like. The optimization coefficients k1, k2, k3, k4, . . . are used for assigning weight to the elements, and each optimization coefficient are larger than 0 and k1+k2+k3+k4 . . . =100. The optimized path establishment control part 28 calculates T=k1·N+k2·A+k3·L+k4/C for each route candidate output by the shortest route search part 29. Then, the optimized path establishment control part 28 sorts the route candidates in ascending order of T so that the dynamic routing table 30 is generated. FIG. 9 shows a concrete example of a process for generating the dynamic routing table 30.

Figure 10:
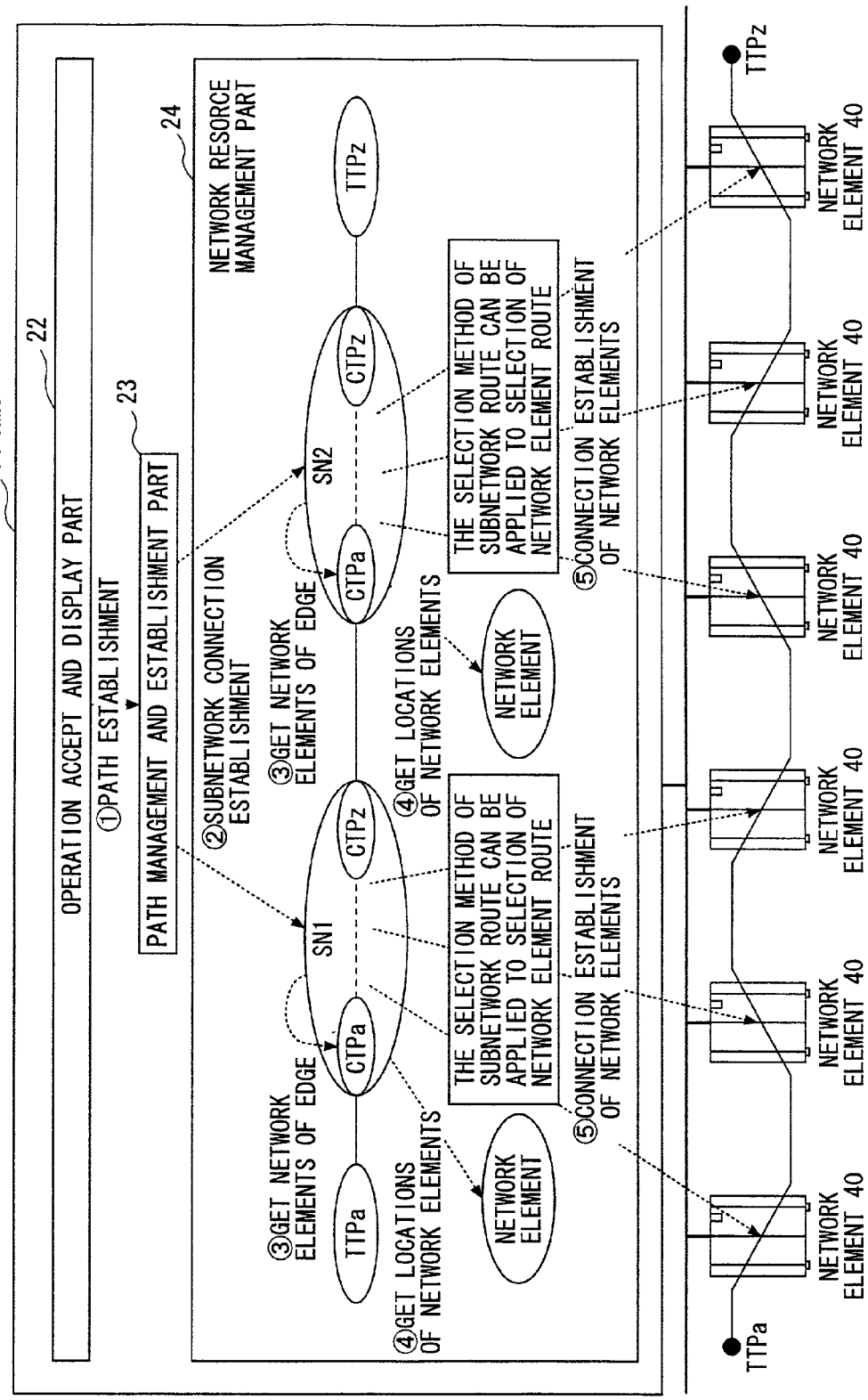
FIG. 10 shows a process for establishing a path.

(Step 5) When the network manager selects a route candidate from among the route candidates sorted in the order of optimization on a graphical user interface, the operation accept and display part 22 issues a path establishment action to the path management and establishment part 23 as shown in FIG. 10. The input information designated at this time is as follows.

Start endpoint (TTPa)
Terminal endpoint (TTPz)
SN1~SNn object addresses (SN means a subnetwork shown in FIG. 3)
Start CTP(CTPa) object address and terminal CTP(CTPz) object address in SN1
:
Start CTP object address and terminal CTP object address in SNn (Step 6) The path management and establishment part 23, as shown in FIG. 10, issues a subnetwork connection establishment action to the network resource management part 24 for each subnetwork object input by the path establishment action. The input information is as follows.
Start CTP(CTPa) object address and terminal CTP(CTPz) object address in SN1
:
Start CTP object address and terminal CTP object address in SNn (Step 7) As shown in FIG. 10, each subnetwork object which received the subnetwork connection establishment action obtains a location of the network element 40 corresponding to the designated start CTP (CTPa), and issues a connection establishment action to the network elements 40 which exist on a route between the start CTP (CTPa) and the terminal CTP (CTPz). As for route selection in each subnetwork, the above-mentioned route selection method for connecting subnetworks can be applied, wherein the network element is substituted for the subnetwork.

(Step 8) When a series of path establishment operations by the network manager is completed normally, the dynamic memory of the dynamic routing table controlled by the optimized route establishment control part 28 is released, and network resource data of paths and subnetwork connections is generated in the network resource management part 24 as shown in FIG. 3.

As for the route selection criteria, the criteria can be designated by specifying a concrete value such as "number of transit network elements=equal to or less than 5" in addition to the designation method like "number of transit network elements=minimum number". For example, when any route is not extracted by using the condition "number of transit network elements=equal to or less than 5" and the number is equal to or more than 10 for every route candidate, routes of number of transit network element=10 are extracted. In addition, as another example, after the network manager is notified that any route does not satisfy the condition "number of transit network elements=equal to or less than 5" via the operation accept and display part 22, route candidates having close value to the route selection criteria may be extracted as the search result. That is, routes of number of transit network elements=10 can be extracted. FIGS. 8D, 8E, 8F shows display examples of the route candidate table (shortest distance, minimum number of network elements, minimum number of alarms respectively) in the case when a value is designated as the route selection criteria and there is no route which satisfies the criteria.

The number of network elements can be added to each route candidate in the route candidate table of the minimum number of network elements output by the shortest route search part 29 before the all route candidate tables are merged into one table as shown in FIG. 9. Then, it can be judged whether there are route candidates which satisfy "number of transit network element=equal to or less than 5". When any route which satisfies this condition is not extracted, the network manager is notified of it by the operation accept and display part 22 so that the network manager can select whether the network manager continues the operation. When the network manager selects continuing the operation, the route candidate having the minimum number of network elements is selected. The same process can be performed for other route selection criteria when the criteria is set by designating a concrete value.

All of the route candidate tables can be merged into one table after the network manager approves route candidates of each route selection criteria in which the concrete value is designated.

As mentioned above, since the route selection criteria can be designated flexibly, network design such as manual route check and incorporation of the routing table into the network management system can be performed in short time even for a large transmission network.

Embodiment 2

When subnetwork connection fails in a subnetwork while performing path establishment by using a first route candidate in the routing table, path establishment can be continued by using another route candidate. In this embodiment 2, this method will be described.

(Step 11) In addition to the distance and the number of network elements and the like, the dynamic routing table 30 has an area for storing a failed connection list which includes subnetwork connections in which path establishment is failed, wherein the connections in this list are not selected next. In the failed connection list, identifiers of subnetwork connections in which path establishment is failed and identifiers of subnetwork connections which can not be used due to failure are stored for identifying subnetwork connections which should be recovered when the path establishment is failed in midstream and for determining another candidate route by which the path establishment is continued when subnetwork connection establishment fails.

By referring to the list every time when establishment of subnetwork connection is performed, it can be judged whether path establishment is continued by using the current candidate route or by using another candidate route.

Figure 12:
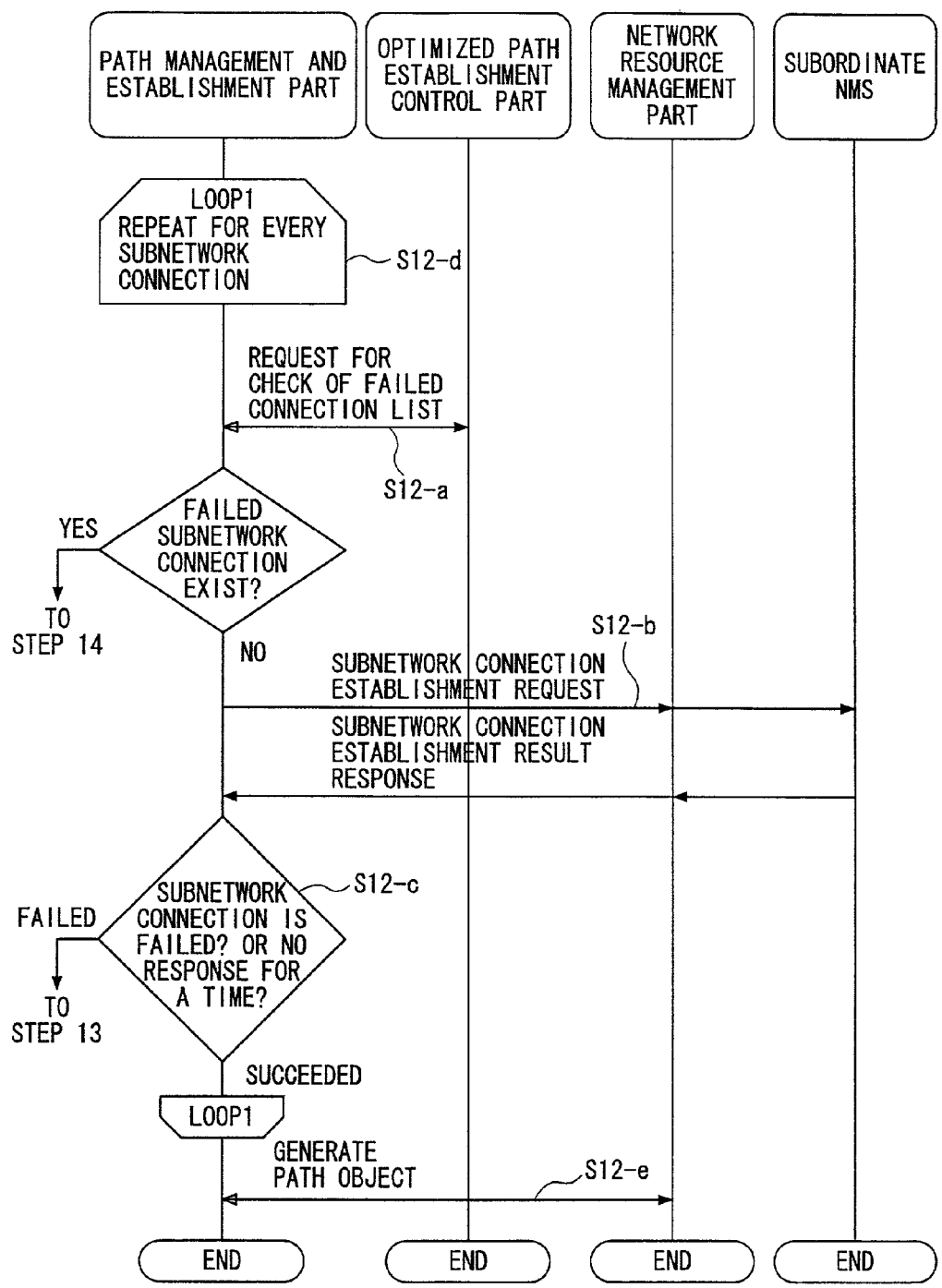
FIG. 12 is a sequence diagram of a process for establishing a path.

(Step 12) Next, a process for performing path establishment by using the first route candidate on the dynamic routing table 30 shown in FIG. 11 will be described. Four subnetwork connections (SN1(1),SN4(2),SN7(2),SN8(1)) will be set respectively in this order. This process will be described by using a sequence diagram shown in FIG. 12.

(Step 12-a) First, the path management and establishment part 23 refers to the failed connection list of the first candidate route on the dynamic routing table 30 and judges whether the subnetwork connection identifier is set via the optimized path establishment control part 28 before first subnetwork connection establishment is performed. When it is not set, the process goes to step 12-b. When it is set, it represents that subnetwork connection establishment for the subnetwork has been failed. In this case, the process goes to step 14 for continuing path establishment by using another route candidate.

(Step 12-b) The path management and establishment part 23 sends a subnetwork connection establishment request to the network resource management part 24 while specifying an identifier of the subnetwork to be established (SN1(1) in this example). The network resource management part 24 sends the subnetwork connection establishment request to the subordinate NMS 12. This process is the same as the subnetwork connection establishment process in the embodiment 1.

(Step 12-c) The path management and establishment part 23 judges whether the subnetwork connection establishment has succeeded or failed according to the subnetwork connection establishment response of the step 12-b. When the subnetwork connection establishment has failed, the process goes to step 13. In addition, when the subnetwork connection establishment response is not returned after a predetermined time, it is judged that the subnetwork connection establishment has failed, and the process goes to step 13.

(Step 12-d) In the same way, the steps 12-a–12-c are performed for other subnetwork connections SN4(2), SN7(2), SN8(1).

(Step 12-e) When establishment of all subnetwork connections succeeds, the path management and establishment part 23 sends a request for generating a path object and a subnetwork connection object to the network resource management part 24 in order to store information on the established path. This step is the same as the embodiment 1. Accordingly, path establishment process ends.

Figure 14:
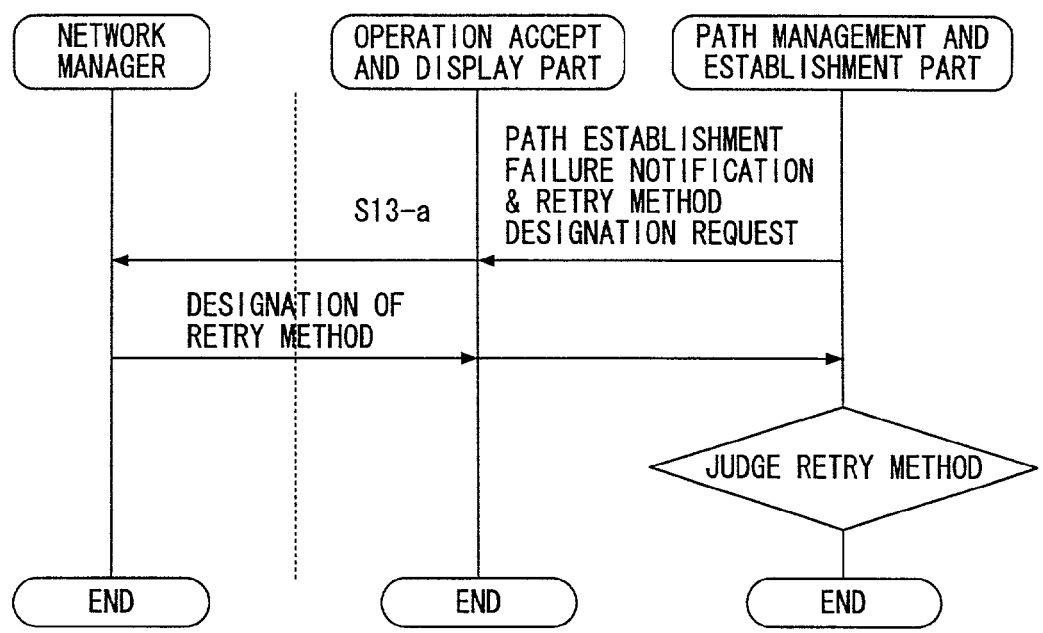
FIG. 14 is a sequence diagram of a process for performing path establishment by using another route candidate.

(Step 13) When subnetwork connection establishment is failed in step 12-c, path establishment is continued by using another route candidate. FIG. 14 shows this process when establishment of subnetwork connections SN1(1), SN4(2) has succeeded, but establishment of subnetwork connection SN7(2) has failed. The dynamic routing table in this case is shown in FIG. 13.

(Step 13-a) The network manager is notified that path establishment has failed via the operation accept and display part 22 by the path management and establishment part 23. At this time, the network manager is allowed to select one of the two following methods.

(a-1) a method in which path establishment is continued by using secondly optimized candidate route in the dynamic routing table 30 shown in FIG. 13.

(a-2) a method in which path establishment is continued by regenerating a dynamic routing table 30 by designating a new route selection criteria, instead of using the dynamic routing table shown in FIG. 13.

When a-1 is selected, step 13-b is performed. When a-2 is selected, step 13-c is performed. This step can be performed when starting path establishment process of the embodiment 1.

Figure 16:
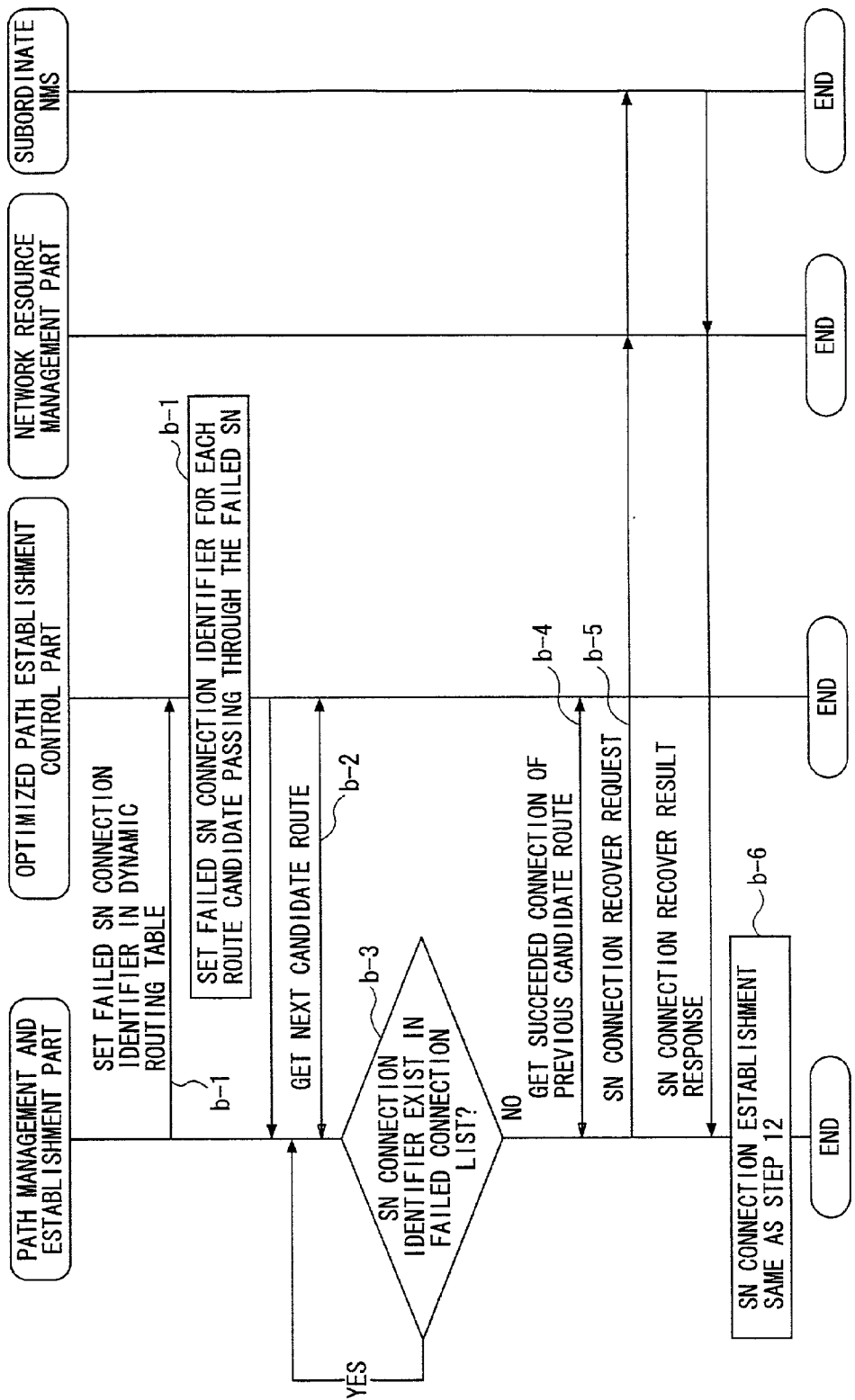
FIG. 16 is a sequence diagram showing an example of the optimized path establishment method.

(Step 13-b) In the following, a case when the network manager selects the method in which path establishment is continued by using secondly optimized candidate route will be described with reference to a sequence diagram shown in FIG. 16.

(b-1) The path management and establishment part 23 sends a request for setting the identifier of the failed subnetwork connection in the dynamic routing table 30 to the optimized path establishment control part 28. The optimized path establishment control part 28 searches the dynamic routing table 30 and sets identifiers for every route candidate which passes through the failed subnetwork connections into the failed connection list. The dynamic routing table which is set here is shown in FIG. 15.

(b-2) Next, the path management and establishment part 23 obtains next candidate (No.2 route candidate) on the dynamic routing table 30 via the optimized path establishment control part 28. This candidate is the route candidate based on which path establishment is continued.

(b-3) Next, the path management and establishment part 23 checks the failed connection list and judges whether obtained candidate route passes through the failed subnetwork connection. If it passes through the connection, next candidate route is obtained since it is known that path establishment process by using the candidate route will fail. For example, route candidates of No.6 and No.7 in FIG. 15 are excluded from candidates used for continuing path establishment. Since the No.2 candidate does not pass through the subnetwork connection (SN7(2)), next step (b-4) is performed.

(b-4) Next, the path management and establishment part 23 obtains succeeded connections (SN1(1) and SN4(2) in this case) of the previous candidate route via the optimized path establishment control part 28.

(b-5) The path management and establishment part 23 sends a request for recovering subnetwork connections (releasing cross connect) by specifying subnetwork connections (SN1(1) and SN4(2) in this case) extracted in (b-4) to the network resource management part 24. The network resource management part 24 sends the request to the subordinate NMS 12.

(b-6) Next, the path management and establishment part 23 sends a request for subnetwork connection establishment in order to continue path establishment by using the second route to the network resource management part 24. The network resource management part 24 sends the request to the subordinate NMS 12. This process is the same as the subnetwork connection establishment process described in step 12. When all subnetwork connections are established, path object and subnetwork object are generated. When failed, the process returned to (b-1) in order to continue path establishment by using a third route candidate.

Figure 17:
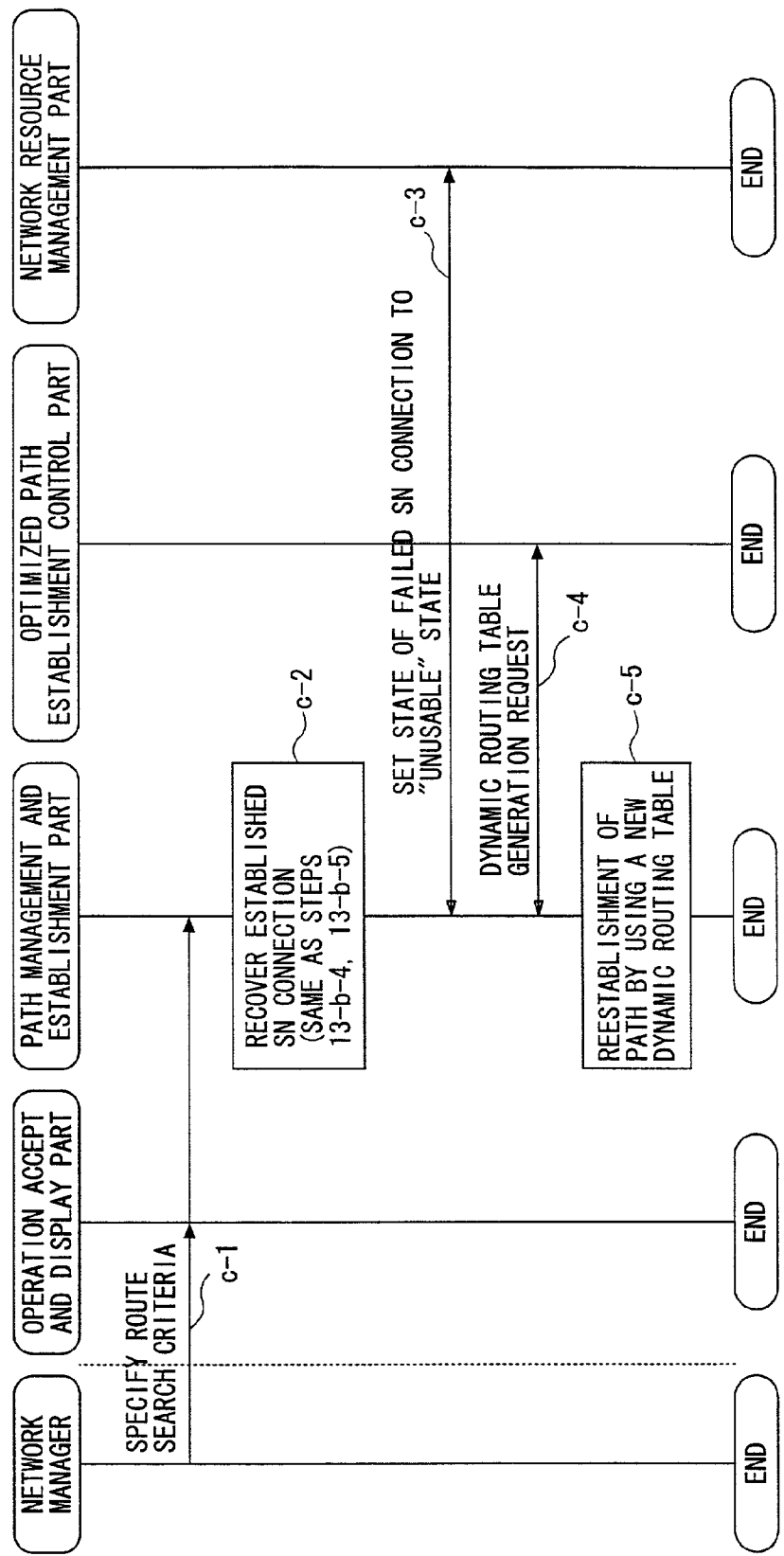
FIG. 17 is a sequence diagram when path establishment is continued by specifying a new selection criterion.

(Step 13-c) FIG. 17 shows a case for continuing path establishment in which the network manager regenerates a dynamic routing table by specifying a new selection criteria instead of using the dynamic routing table shown in FIG. 13.

(c-1) The path management and establishment part 23 receives the criteria for searching for route candidates via the operation accept and display part 22. The method for selecting the criteria is the same as that in the embodiment 1.

(c-2) The path management and establishment part 23 recovers established subnetwork connections (release of cross connect). This process is the same as b-4 and b-5 in step 13.

(c-3) The path management and establishment part 23 sends a request for setting a state of each subnetwork connection in which establishment is failed to "unusable" state for the network resource management part 24. The network resource management part 24 which received this request sets a state of the object which manages the specified subnetwork connection to "unusable" state. By performing this process, only routes which do not pass through the failed subnetwork connections can be obtained as route candidates for generating a new dynamic routing table 30.

(c-4) Next, the path management and establishment part 23 sends a request for generating the dynamic routing table 30 to the optimized path establishment control part 28 by designating the selection criteria. This step is the same as the corresponding step of embodiment 1. According to this step, a new dynamic routing table is generated.

(c-5) Next, the path management and establishment part 23 continues to perform path establishment by using the new dynamic routing table 30. This step is the same as step 12.

(Step 14) There exits a subnetwork connection identifier in the failed connection list in the dynamic routing table 30 in step 12-a when following cases occur.

First, when a failure occurs in a subnetwork connection in which establishment has succeeded. In this case, it is necessary that path establishment is continued after releasing established subnetwork connection.

Figure 18:
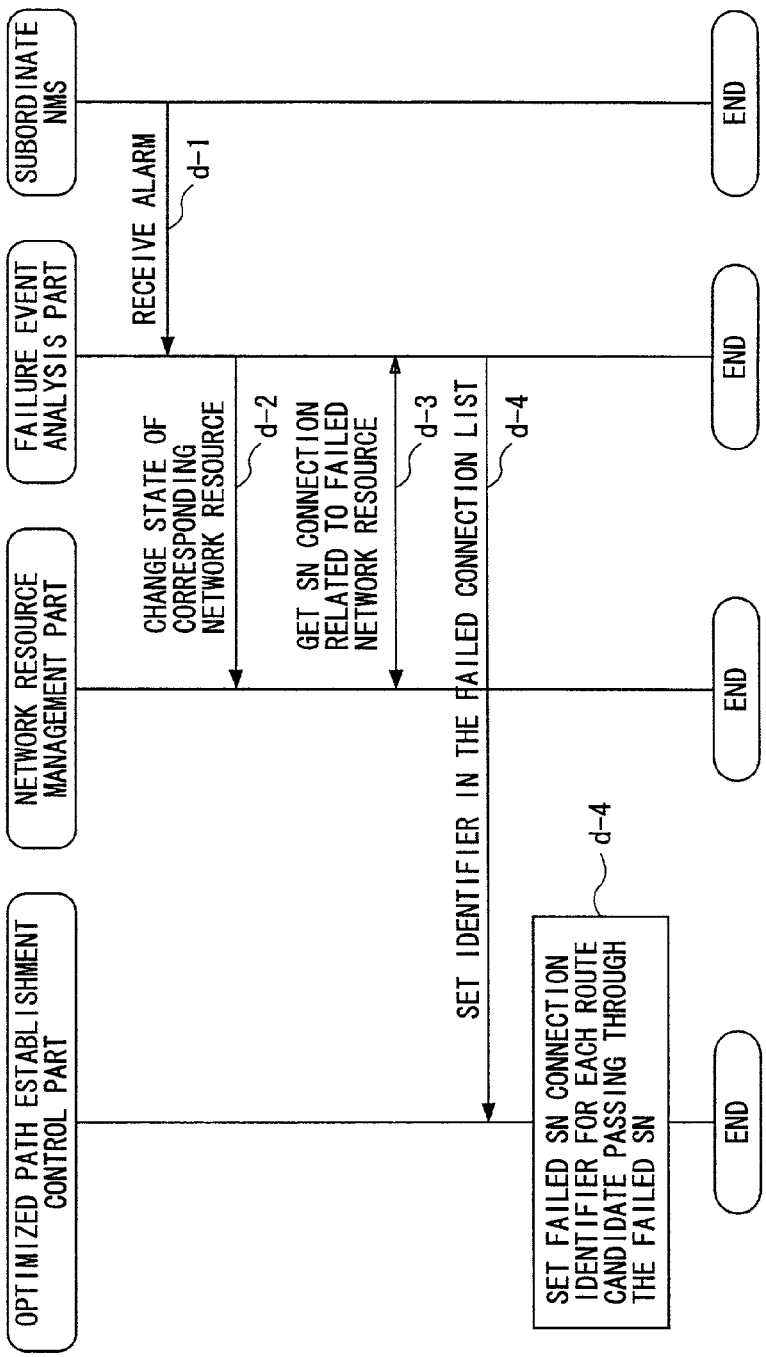
FIG. 18 is a sequence diagram showing a process for setting subnetwork connection identifier.

Second, when a failure occurs on a route which is not established yet. FIG. 18 shows a process for setting a subnetwork connection identifier related to the failure into the failed connection list in this case.

In FIG. 18, when the failure event analysis part receives an alarm of the network resource (subnetwork connection, CTP, physical link) from the subordinate NMS 12 (step d-1), the failure event analysis part changes the state of the network resource corresponding to the alarm into a failure state via the network resource management part 24 (step d-2). Next, the failure event analysis part obtains the identifier of the subnetwork connection related to the failed network resource from the network resource management part 24 (step d-3).

Next, the failure event analysis part searches the dynamic routing table 30 via the optimized path establishment control part 28 so that the failure event analysis part sets the identifier of the subnetwork connection related to the failure in the failure connection list for every route candidate which passes through the subnetwork connection (step d-4). Accordingly, the route candidates which includes the failed subnetwork are excluded from candidates to be processed for continued path establishment so that path establishment can be continued efficiently.

In this case, path establishment can be continued in the same way as the above-mentioned step (13). However, setting of the failure connection list is completed in this case, b-1 in step 13-b and c-3 in step 13-c are not necessary.

Embodiment 3

Figure 19:
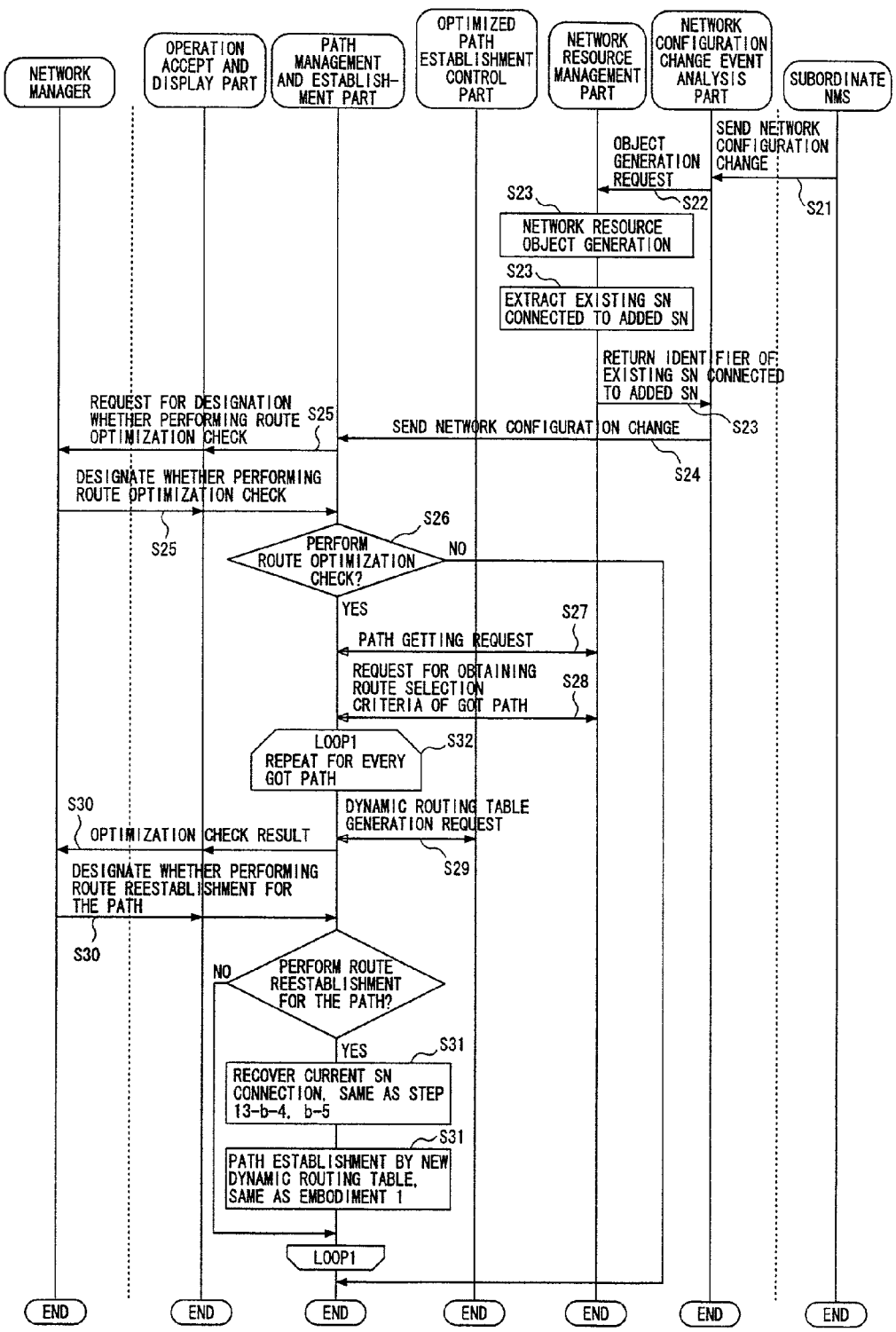
FIG. 19 is a sequence diagram when a subnetwork is added.

In a transmission network under operation, when a new subnetwork or a new network element is added, or, when a subnetwork or a network element is removed, an optimized route is reselected by using a route selection criteria stored in an existing path object. In this embodiment, this method will be described. As an example, a case where a subnetwork is added will be described with reference to a sequence diagram shown in FIG. 19.

(Step 21) This process starts at the time when the network configuration change event analysis part 31 receives a network configuration change notification from the subordinate NMS 12 for example. In this network configuration change notification includes an added subnetwork, a physical link, CTPs which form the subnetwork and attribute information (information shown in FIG. 3) of the subnetwork connection.

(Step 22) Next, the network configuration change event analysis part 31 sends a request for generating objects corresponding to the added subnetwork, the physical link, the CTPs which forms the subnetwork and the subnetwork connection to the network resource management part 24. The network configuration change event analysis part 31 sends the subnetwork, the physical link, the CTPs which form the subnetwork and attribute information of the subnetwork connection to the network resource management part 24 as input information.

(Step 23) The network resource management part 24 generates each network resource object on the basis of the input information. In addition, the network resource management part 24 extracts existing subnetworks connected to the added subnetwork and returns the identifiers to the network configuration change event analysis part 31.

(Step 24) After completing step 23, the network configuration change event analysis part 31 sends a network configuration change notification to the path management and establishment part 23. As input parameters, the network configuration change event analysis part 31 sends the identifiers of the existing subnetworks connected to the added subnetwork to the path management and establishment part 23.

(Step 25) The path management and establishment part 23 which received the network configuration change notification displays a dialog via the operation accept and display part 22 so that the network manager is informed that the network configuration has been changed and is prompted to perform optimized route reselection for established path. The network manager designates whether the optimized route reselection is performed via the dialog and the designation is returned to the path management and establishment part 23.

(Step 26) The path management and establishment part 23 checks the designation by the network manager. When the reselection is not performed, the process ends.

A case when the optimized route reselection is performed will be described in the following.

(Step 27) The path management and establishment part 23 sends a request for obtaining all paths which pass through the existing subnetworks connected to the added subnetwork to the network resource management part 24. The path management and establishment part 23 sends the identifiers of the existing subnetworks connected to the added subnetwork to the network resource management part 24 as input information. The network resource management part 24 searches for every path which satisfies the condition and returns the identifiers to the path management and establishment part 23.

(Step 28) Next, the path management and establishment part 23 sends a request for obtaining the route selection criteria and the optimized coefficients for each of the paths obtained in step 27 to the network resource management part 24. As input information, the path management and establishment part 23 sends the identifiers of the paths obtained in step 27 to the network resource management part 24. The network resource management part 24 obtains the route selection criteria and the optimization coefficients which are held by each of objects of the specified paths and returns them to the path management and establishment part 23.

(Step 29) Next, the path management and establishment part 23 sends a request for newly generating the dynamic routing table 30 to the optimized path establishment control part 28. This method is the same as that of the embodiment 1. This process is performed for every path which passes through the existing subnetwork connected to the added subnetwork.

(Step 30) After completing step 29, the path management and establishment part 23 displays a dialog via the operation accept and display part 22 so that the dynamic routing table 30 of the path is presented to the network manager and the network manager is prompted for designation whether reestablishment of path will be performed.

(Step 31) When the reestablishment of the path will be performed, the path management and establishment part 23 recovers the current path settings (release of cross connect, this process is the same as b-4, b-5 in step 13-b), and route reestablishment is performed by using the dynamic routing table 30 newly generated in step 29 (this process is the same as corresponding process in the embodiment 1 and the embodiment 2). Accordingly, a path of more optimized route can be established. When the path reestablishment is not performed, next step 32 is performed.

(Step 32) The process from step 29 to step 31 is performed for every path obtained in step 27. Accordingly, the process in this embodiment ends.

Figure 20:
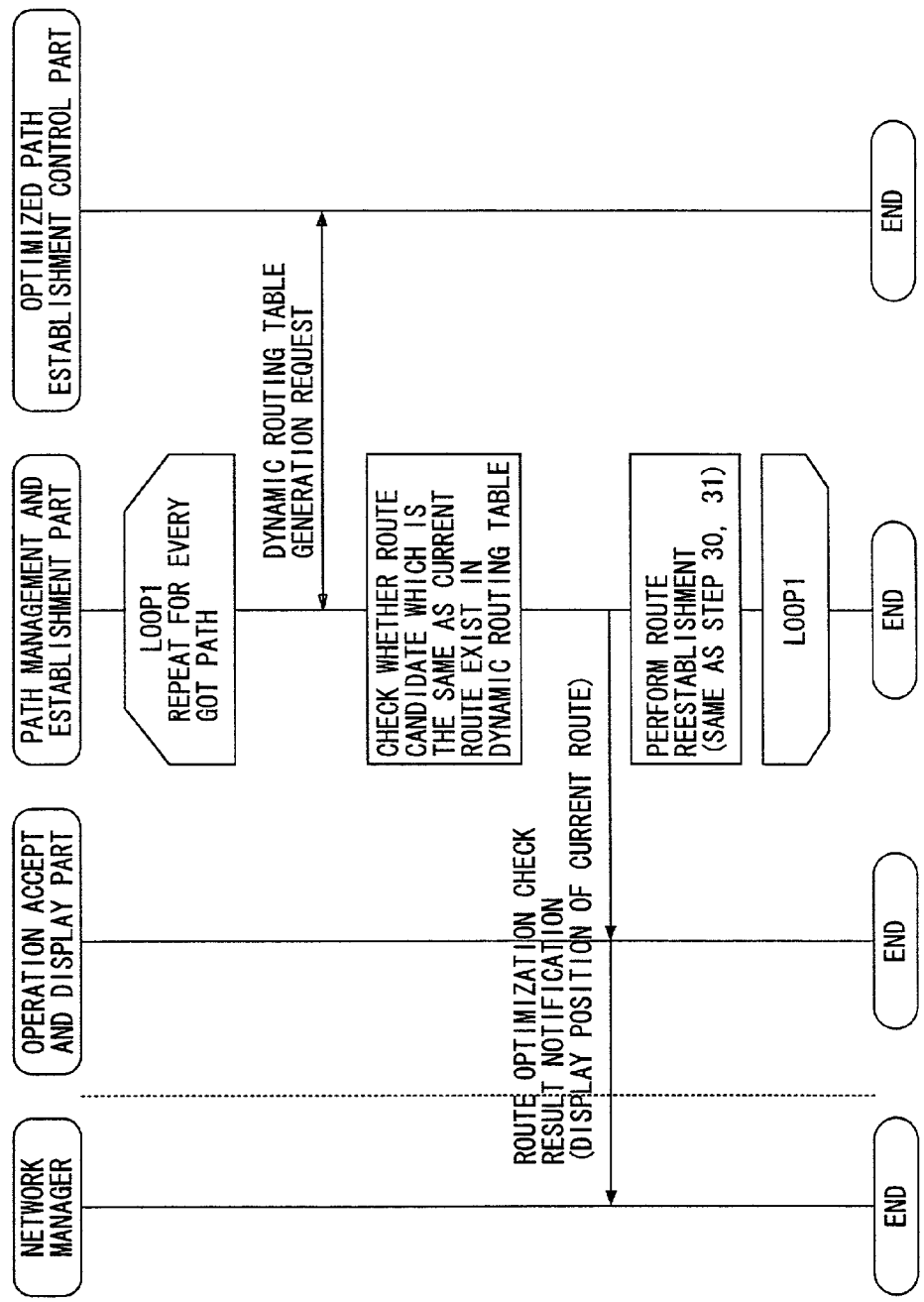
FIG. 20 is a sequence diagram showing a process for displaying position of current route.

In the steps 29 and 30, instead of simply presenting the dynamic routing table 30 to the network manager, the position of the current route in the dynamic routing table may be presented to the network manager. Accordingly, the network manager can judge immediately whether there is a route which is more optimized than the current route. This method can be realized by searching the dynamic routing table 30 for a route candidate which is the same as the current route after the dynamic routing table 30 is generated as shown in a sequence diagram shown in FIG. 20.

Figure 21:
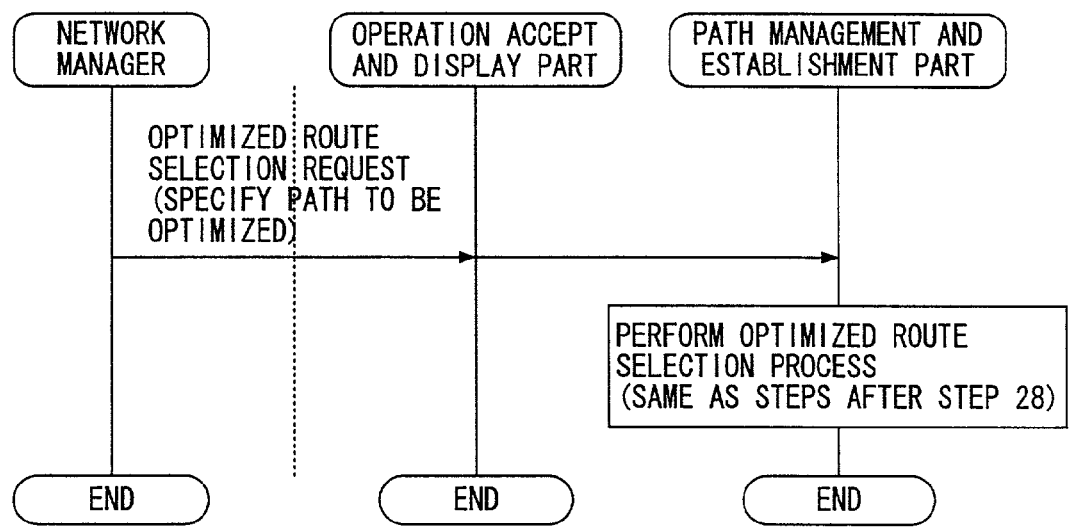
FIG. 21 is a sequence diagram when a network manager requests optimized route reselection.

The optimized route reselection for established paths described in the embodiment 3 can be started at the time when the network manager requests the optimized route reselection to the path management and establishment part 23 at any timing as shown in a sequence diagram of FIG. 21, instead of when receiving the network configuration change notification from the subordinate NMS 12. In this case, the network manager specifies one or a plurality of paths on which optimization check is performed.

Following two cases are cases where a subnetwork or a network element is removed.

(a) a case where the subordinate NMS 12 removes a subnetwork forcedly even when a path exists which passes through the subnetwork. In this case, the path can be reestablished speedily by generating the dynamic routing table 30 for every path which passes through the subnetwork and presenting the table to the network manager.

(b) a case where the network manager erroneously tries to remove a subnetwork even when a path exists which passes through the subnetwork. In this case, the NMS 14 notifies the network manager that the subnetwork can not be removed since there is the path, and the network manager can specify whether calculation of alternative route is necessary. After that, the dynamic routing table 30 is generated for routes which do not pass through the subnetwork and is presented to the network manager.

As mentioned above, according to the present invention, network design such as manual route check and incorporating routing table into the network management system can be performed in short time even for a large transmission network. In addition, time for performing maintenance of the routing table associated with network configuration change can be decreased. Further, selection of subnetworks at the time of path establishment can be omitted, and path establishment can be continued by using the next optimized route when path establishment failed. Therefore, time required from network design completion to network implementation can be decreased. Thus, maintenance cost can be decreased. In addition, it is not necessary to reserve alternative routes as preparedness for failure of the transmission network under operation so that equipment cost can be decreased.

In addition, since network design is not performed manually, it is not necessary to incorporate the routing table into the network management system. Thus, accuracy of network design for operating the network efficiently can be improved. Further, a network can be configured flexibly, timely and easily by performing simulation of network design at any timing. Therefore, performance of the system and network can be improved.

Embodiment 4

In this embodiment, a method will be described in which the network manager selects a plurality of existing paths at any timing, and an optimized route is re-extracted for each selected path.

(Step 41) The path management and establishment part 23 obtains two endpoints of a path and route selection criteria used for establishing the path from the network resource management part 24 for every path specified in a path list to be checked which is input in the existing path route optimization check operation by the network manager. After that, the path management and establishment part 24 input pairs of the two endpoints and the route selection criteria to the optimized path establishment control part 28 pair by pair. Then, the steps 1–4 in the embodiment 1 are repeated for the specified paths.

(Step 42) For each of the paths to be checked, a current path route is compared with each of candidate routes which are sorted in optimized order. Then, path routes different from the corresponding optimized routes are highlighted so that the result is presented to the network manager on the operation accept and display part 22.

(Step 43) When the network manager continues path reestablishment for the checked paths in which the route is difference from the optimized route, steps after the step 31 in the embodiment 3 are performed for each of the paths.

Accordingly, a network can be configured flexibly, timely and easily by performing simulation of network design at any timing.

The network management system of the present invention can be also realized by one or more computers by launching a program based on the method of the present invention.

The program can be stored in a computer readable medium such as a CD-ROM and the like. By installing the program which is stored in the CD-ROM in the computer, the computer can be used as the NMS.

As mentioned above, according to the present invention, route check and network design can be performed in a short time. In addition, time required for maintenance associated with network configuration change can be reduced, and it is not necessary to reserve an alternative route beforehand. Thus, equipment cost can be reduced.

In addition, since the method of the present invention may includes the steps of: selecting another selected route candidate when the first route search or the second route search fails; and performing another route search on the another selected route candidate, when path establishment fails, the optimized path can be established by using another route candidate.

In addition, according to the present invention, the dynamic routing table includes a failed connection list which includes connections of network elements or connections of subnetworks on which path establishment is failed, and each route candidate which includes the connection is excluded from route candidates from which the another selected route candidate is selected. Therefore, useless route search is not performed for subnetwork connection route or network element connection route, the optimized path can be established in a short time.

In addition, the optimized path can be established according to the route selection elements which includes at least any element of network element number, alarm occurrence number, shortest distance, and available capacity, and, optimization coefficients each representing weight of the element.

In addition, since the network management system of the present invention can displays the route candidates stored in the dynamic routing table and accepts selection operation, the network manager can select the route candidate stored in the dynamic routing table.

Further, the path establishment can be performed when a new path needs to be established, when a network element is added or removed, network failure is detected, or according to an instruction of execution of path establishment process, or the like.

Further, according to the present invention, a value of a route selection criterion can be specified as the route selection element and a route candidate in which the route selection criterion is close to the value is selected when any route candidate which satisfies the value is not searched. Therefore, network design which includes manual route checking, incorporation of routing table into the network management system or the like can be performed in a short time.

The present invention is not limited to the specifically disclosed embodiments, and variations and modifications may be made without departing from the scope of the invention.

What is claimed is:

1. A method used for establishing an optimized path between two endpoints in a transmission network including subnetworks, said method comprising the steps of:
   specifying two endpoints and route selection elements;
   performing a first route search to search for route candidates each of which connects subnetworks by using data on network resources according to said route selection elements, and storing said route candidates in a dynamic routing table;
   selecting a route candidate as a selected route candidate according to said route selection elements;
   performing a second route search to search for a route connecting network elements in each subnetwork on said selected route candidate; and
   establishing said optimized path based at least in part on said second route search,
   wherein each subnetwork includes plural network elements, said selected route candidate includes edge network elements of each of said subnetworks included in said selected route candidate, and the edge network elements are used in said second route search for each subnetwork.

2. The method as claimed in claim 1, further comprising the steps of:
   selecting another selected route candidate when said first route search or said second route search fails; and
   performing another route search on said another selected route candidate.

3. The method as claimed in claim 2, wherein said dynamic routing table includes a failed connection list which includes connections of network elements or connections of subnetworks on which path establishment is failed, and each route candidate which includes said connection is excluded from route candidates from which said another selected route candidate is selected.

4. A network management system used for establishment of an optimized path between two endpoints in a transmission network including subnetworks, said network management system comprising:
   a part which specifies two endpoints and route selection elements;
   a part which performs a first route search to search for route candidates each of which connects subnetworks by using data on network resources according to said route selection elements, and stores said route candidates in a dynamic routing table;
   a part which selects a route candidate as a selected route candidate according to said route selection elements;
   a part which performs a second route search to search for a route connecting network elements in each subnetwork on said selected route candidate; and
   a part which establishes said optimized path based at least in part on said second route search,
   wherein each subnetwork includes plural network elements, said selected route candidate includes edge network elements of each of said subnetworks included in said selected route candidate, and the edge network elements are used in said second route search for each subnetwork.

5. The network management system as claimed in claim 4, further comprising:
   a part which selects another selected route candidate when said first route search or said second route search fails; and
   a part which performs another route search on said another selected route candidate.

6. The network management system as claimed in claim 4, wherein said dynamic routing table includes a failed connection list which includes connections of network elements or connections of subnetworks on which path establishment is failed, and each route candidate which includes said connection is excluded from route candidates from which said another selected route candidate is selected.

7. The network management system as claimed in claim 4, wherein said route selection elements includes at least any one of elements on network element number, alarm occurrence number, shortest distance, and available capacity, and, optimization coefficients each representing weight of said element.

8. The network management system as claimed in claim 4, further comprising:
   a part which displays said route candidates stored in said dynamic routing table and accepts selection operation.

9. The network management system as claimed in claim 4, wherein said establishment of said optimized path is performed when a new path needs to be established.

10. The network management system as claimed in claim 4, wherein said establishment of said optimized path is performed when a network element is added or removed.

11. The network management system as claimed in claim 4, wherein said establishment of said optimized path is performed when network failure is detected.

12. The network management system as claimed in claim 4, further comprising:
   a part which specifies a value of a route selection criterion as said route selection element; and
   a part which selects a candidate route in which said route selection criterion of said candidate route is close to said value when any route candidate which satisfies said value is not searched.

13. The network management system as claimed in claim 4, wherein said establishment of said optimized path is performed according to an instruction about execution of path establishment process.

14. A computer readable medium storing program code for causing a computer to establish an optimized path between two endpoints in a transmission network including subnetworks, said computer readable medium comprising:
   program code for specifying two endpoints and route selection elements;

program code for performing a first route search to search for route candidates each of which connects subnetworks by using data on network resources according to said route selection elements, and storing said route candidates in a dynamic routing table;

program code for selecting a route candidate as a selected route candidate according to said route selection elements;

program code for performing a second route search to search for a route connecting network elements in each subnetwork on said selected route candidate; and program code for establishing said optimized path based at least in part on said second route search, wherein each subnetwork includes plural network elements, said selected route candidate includes edge network elements of each of said subnetworks included in said selected route candidate, and the edge network elements are used in said second route search for each subnetwork.

15. The computer readable medium as claimed in claim 14, further comprising:

program code for selecting another selected route candidate when said first route search or said second route search fails; and program code for performing another route search on said another selected route candidate.

16. The computer readable medium as claimed in claim 14, wherein said dynamic routing table includes a failed connection list which includes connections of network elements or connections of subnetworks on which path establishment is failed, and each route candidate which includes said connection is excluded from route candidates from which said another selected route candidate is selected.

17. The computer readable medium as claimed in claim 14, wherein said route selection elements includes at least any element of network element number, alarm occurrence number, shortest distance, and available capacity, and, optimization coefficients each representing weight of said element.

18. The computer readable medium as claimed in claim 14, further comprising:

program code for displaying said route candidates stored in said dynamic routing table and accepting selection operation.

19. The computer readable medium as claimed in claim 14, further comprising:

program code for specifying a value of a route selection criterion as said route selection element; and program code for selecting a candidate route in which said route selection criterion of said candidate route is close to said value when any route candidate which satisfies said value is not searched.

* * * * *